US012584052B2

(12) United States Patent
Mhetar et al.

(10) Patent No.: US 12,584,052 B2
(45) Date of Patent: **\*Mar. 24, 2026**

(54) SELF-STERILIZING PROTECTION FOR SURFACES

(71) Applicant: Kraton Corporation, The Woodlands, TX (US)

(72) Inventors: Vijay Mhetar, Houston, TX (US); Richard Blackwell, Houston, TX (US); Roger Tocchetto, Houston, TX (US); Sharman McGilbert, Houston, TX (US); Lee Barnes, Houston, TX (US); Bharadwaja Peddinti, Houston, TX (US)

(73) Assignee: Kraton Corporation, The Woodlands, TX (US)

( * ) Notice: Subject to any disclaimer, the term of this patent is extended or adjusted under 35 U.S.C. 154(b) by 265 days.

This patent is subject to a terminal disclaimer.

(21) Appl. No.: 17/995,762

(22) PCT Filed: Apr. 19, 2021

(86) PCT No.: PCT/US2021/070407
§ 371 (c)(1),
(2) Date: Oct. 7, 2022

(87) PCT Pub. No.: WO2021/212148
PCT Pub. Date: Oct. 21, 2021

(65) Prior Publication Data
US 2023/0167343 A1 Jun. 1, 2023

Related U.S. Application Data

(60) Provisional application No. 63/200,298, filed on Feb. 28, 2021, provisional application No. 63/052,914, (Continued)

(51) Int. Cl.
| | | |
|---|---|---|
| *C09J 181/08* | (2006.01) | |
| *C09J 7/20* | (2018.01) | |
| *C09J 9/00* | (2006.01) | |

(52) U.S. Cl.
CPC ............ *C09J 181/08* (2013.01); *C09J 7/203* (2018.01); *C09J 9/00* (2013.01); *C09J 2301/122* (2020.08);
(Continued)

(58) Field of Classification Search
CPC ... C09J 181/08; C09J 7/203; C09J 9/00; C09J 2301/122; C09J 2301/312; C09J 2301/408;
(Continued)

(56) References Cited

U.S. PATENT DOCUMENTS

| | | | | | |
|---|---|---|---|---|---|
| 3,642,953 | A | * | 2/1972 | O'Neill | ..................... C08F 8/36 |
| | | | | | 525/344 |
| 7,737,224 | B2 | * | 6/2010 | Willis | .................. B01D 71/401 |
| | | | | | 526/287 |

(Continued)

FOREIGN PATENT DOCUMENTS

| | | |
|---|---|---|
| CA | 2241381 A | 12/1998 |
| CN | 104310795 A | 1/2015 |

(Continued)

OTHER PUBLICATIONS

English Translation of JP-2013193966-A (Year: 2013).*

*Primary Examiner* — Mark Eashoo
*Assistant Examiner* — Cullen L G Davidson

(57) ABSTRACT

The disclosure relates to laminate structures to cover or protect substrates or surfaces. The laminate structure comprises a support layer and a self-sterilizing/antimicrobial layer comprising a sulfonated polymer, capable of killing microbes within minutes and for an extended period of time.
(Continued)

The sulfonated polymer has a sufficient degree of sulfonation to kill in less than 120 minutes at least 90% of microbes in contact with the surfaces, and for extended protection of the surfaces for at least one month. The laminate structure is particularly suitable for protecting high-touch surfaces such as door knobs, touch-screens, tables, as well as for use with facemasks, face shields, or as self-sterilizing wraps for surgical instruments and supplies. The laminates can also be used as garments or to cover/protect personnel having contagious diseases, etc., to decrease the transmission of microbes.

13 Claims, 14 Drawing Sheets

Related U.S. Application Data filed on Jul. 16, 2020, provisional application No. 63/019,634, filed on May 4, 2020, provisional application No. 63/011,576, filed on Apr. 17, 2020.

(52) U.S. Cl.
CPC .... *C09J 2301/312* (2020.08); *C09J 2301/408* (2020.08)

(58) Field of Classification Search
CPC .............. B32B 37/24; B32B 2037/243; B32B 2307/7145; B32B 2307/748
See application file for complete search history.

(56) References Cited

U.S. PATENT DOCUMENTS

| | | |
|---|---|---|
| 2003/0203991 A1 | 10/2003 | Schottman |
| 2004/0142910 A1 | 7/2004 | Vachon |
| 2007/0021569 A1 | 1/2007 | Willis |
| 2009/0078119 A1 | 3/2009 | Buckley |
| 2010/0087769 A1 | 4/2010 | Bukshpan et al. |
| 2010/0261799 A1* | 10/2010 | Vachon ................... C08L 75/08 |
| | | 514/772.1 |
| 2010/0272768 A1 | 10/2010 | Bukshpan et al. |
| 2011/0268901 A1 | 11/2011 | Handlin, Jr. et al. |
| 2013/0052153 A1 | 2/2013 | Lin |
| 2014/0171518 A1 | 6/2014 | Vachon |
| 2014/0370306 A1 | 12/2014 | Park |
| 2015/0024017 A1 | 1/2015 | Bukshpan |
| 2016/0032036 A1 | 2/2016 | Okazaki |
| 2017/0304815 A1* | 10/2017 | Vachon ................... C08L 57/06 |
| 2020/0016545 A1 | 1/2020 | Seo et al. |

FOREIGN PATENT DOCUMENTS

| | | | |
|---|---|---|---|
| CN | 108653796 A | | 10/2018 |
| EP | 1669093 A1 | | 6/2006 |
| EP | 2947483 A1 | | 11/2015 |
| JP | H11 240807 A | | 9/1999 |
| JP | 2011-136977 A | | 7/2011 |
| JP | 2013193966 A | * | 9/2013 |
| KR | 2015 0137721 A | | 12/2015 |
| WO | 99/47579 A1 | | 9/1999 |
| WO | 2006/017245 A2 | | 2/2006 |
| WO | 2007/007115 A2 | | 1/2007 |
| WO | 2009/076722 A1 | | 6/2009 |
| WO | 2009/146412 A1 | | 12/2009 |

* cited by examiner

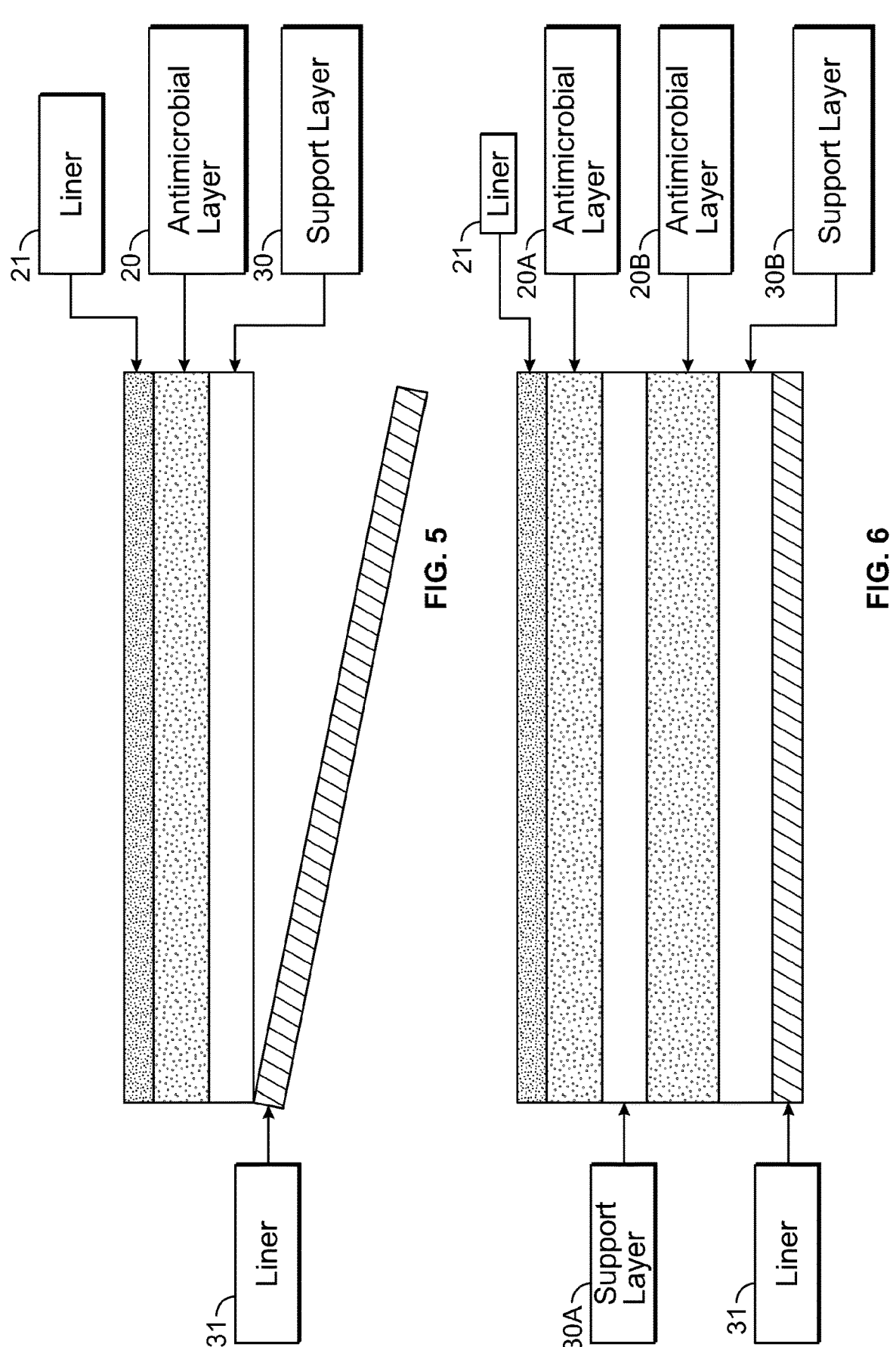

Liner
21

20
Antimicrobial
Layer

30
Optional Support
Layer

10
Substrate

SELF-STERILIZING PROTECTION FOR SURFACES

TECHNICAL FIELD

The disclosure relates to self-sterilizing surfaces for protection from infectious diseases, and methods for providing antimicrobial protection with a self-sterilizing surface.

BACKGROUND

Many infectious diseases are transmitted through contact with touch surfaces, such as, but not limited to escalator grab rails, subway grab rails, seats in trains, planes and buses, ticket kiosks, hospital beds, counter-tops, table-tops, door knobs and handles, bathroom hardware, etc. These touch surfaces can carry pathogens for days. While these surfaces can be, and usually are, periodically disinfected, it is impossible to manually cleanse these touch surfaces after every individual contact. This would be impractical, expensive, time consuming, and could even lead to the emergence of resistant pathogens.

Metals such as copper and silver have been used to impart antimicrobial properties as protective surface. The metals are leachable and therefore not durable. There are current developments for coatings containing nanoparticles of copper that can be painted or sprayed on surfaces. Recent studies at Imperial College showed that the ions in copper alloys are both antiviral and antibacterial, able to kill over 99.9% of bacterial within two hours.

With the COVID-19 pandemic affecting every corner of the world, there is an urgent need for solutions that provide protection from microbes such as SARS-CoV-2 and other emerging threats, particularly a self-sterilizing surface that can be easily applied onto different substrates to quickly and efficiently kill the microbes upon contact within minutes and not hours.

SUMMARY

In one aspect, the disclosure relates to laminate structure for the protection of surfaces with self-sterilizing characteristics. The laminate structure comprises at least one antimicrobial layer and a second layer. The antimicrobial layer comprises a sulfonated polymer selected from the group of perfluorosulfonic acid polymers, polystyrene sulfonates, sulfonated block copolymers, sulfonated polyolefins, sulfonated polyimides, sulfonated polyamides, sulfonated polyesters, sulfonated polysulfones, sulfonated polyketones, sulfonated poly(arylene ether), and mixtures thereof. The sulfonated polymer has a degree of sulfonation of >10%. The antimicrobial layer has a thickness of at least >1 μm to kill at least 90% microbes within 120 minutes of contact with the laminate structure. The laminate structure is removably adhered to the surfaces electrostatically, adhesively, or by mechanical means.

In another aspect, the sulfonated polymer is a selectively sulfonated block copolymer having a general configuration of: A-B-A, (A-B)$_n$(A), (A-B-A)$_n$X, (A-B)$_n$X, A-D-B, A-B-D, A-D-B-D-A, A-B-D-B-A, (A-D-B)$_n$A, (A-B-D)$_n$A (A-D-B)$_n$X, (B-D-B)$_n$X, (A-B-D)$_n$X or mixtures thereof, wherein: n is an integer from 0 to 30, X is a coupling agent residue, each A and D block is a polymer block resistant to sulfonation, each B block is susceptible to sulfonation. In embodiments, the antimicrobial layer consists essentially of a selectively sulfonated block copolymer having a general configuration of: A-B-A, (A-B)$_n$(A), (A-B-A)$_n$, (A-B-A)$_n$X, (A-B)$_n$X, A-D-B, A-B-D, A-D-B-D-A, A-B-D-B-A, (A-D-B)$_n$A, (A-B-D)$_n$A (A-D-B)$_n$X, (A-B-D)$_n$X or mixtures thereof, wherein: n is an integer from 0 to 30, X is a coupling agent residue, each A and D block is a polymer block resistant to sulfonation, each B block is susceptible to sulfonation. In embodiments with plurality of A, B or D blocks, the A block, the B block, and the D block can be the same or different. The A block is selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof. The B block is a vinyl aromatic monomer. The D block is a hydrogenated polymer or copolymer of a conjugated diene selected from isoprene, 1,3-butadiene and mixtures thereof. The block B is selectively sulfonated to contain from 10-100 mol % sulfonic acid or sulfonate salt functional groups based on the number of monomer units, for killing at least 99% of microbes within 30 minutes of coming into contact with the antimicrobial layer.

In some aspects, the antimicrobial layer comprises at least 50 wt. %, more preferably at least 70 wt. %, even more preferably at least 90 wt. %, yet more preferably at least 95 wt. %, still more preferably at least 98 wt. %, even more preferably at least 99 wt. % and most preferably 100 wt. % (i.e. consists) of one or more of the sulfonated polymers.

In another aspect, a method of making a laminate structure for protecting surfaces prone to microbial contamination is disclosed. The method comprises applying an antimicrobial composition to a self-adhering peel and stick substrate having a removable liner and an adhesive layer disposed substantially on entire surface of the removable liner, for the antimicrobial composition to substantially coat the entire surface of the adhesive layer forming an antimicrobial layer.

In another aspect, yet another method for making a laminate structure for protecting surfaces prone to microbial contamination. The method comprises: applying an antimicrobial composition to a first structural element to form a coating on the first structural element; removing at least a portion of one or more solvents from the antimicrobial composition to form an antimicrobial layer; applying an adhesive layer to the outer surface of the antimicrobial layer; removing at least a portion of one or more solvents from the adhesive layer to form an support layer; and optionally, adding a second structural element to cover the support layer.

In embodiments, the laminate structure has one or more support layers, or comprises at least one structural element selected from one or more of a support layer and a liner, or having at least two structural elements, each of which is a liner. In embodiments, the antimicrobial layer is in contact with one liner layer, and the second layer is in contact with a second liner layer. In embodiments, at least a structural element is a release liner.

In embodiments, the laminate structure is in the form of an individual sheet, or a continuous sheet roll

DESCRIPTION OF FIGURES

FIG. 5 a side view of the four-layer laminate structure in FIG. 4, as the protective liner for the support layer is being peeled off prior to placing the laminate structure onto a substrate (not shown).

FIG. 6 is a side view of an embodiment of a multi-layer structure, with two antimicrobial protective layers.

DESCRIPTION

Figures 1, 2:
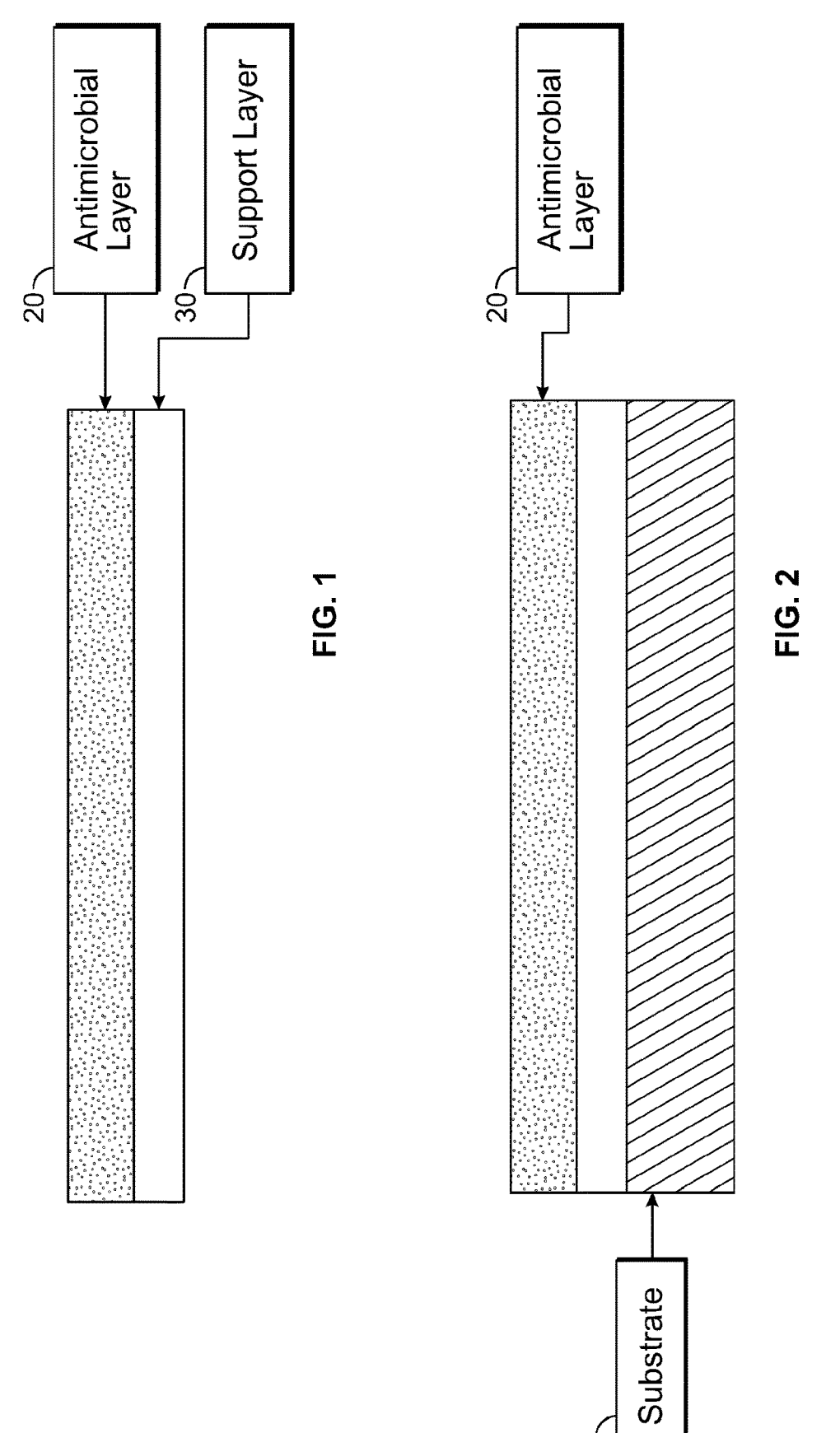
FIG. 1 is a side view of an embodiment of a laminate structure, with a support layer and an antimicrobial layer.
FIG. 2 is a side view of a substrate protected by the two-layer laminate structure.

The following terms used the specification have the following meanings:

"Ion Exchange Capacity" or IEC refers to the total active sites or functional groups responsible for ion exchange in a polymer. Generally, a conventional acid-base titration method is used to determine the IEC, see for example International Journal of Hydrogen Energy, Volume 39, Issue 10, Mar. 26, 2014, Pages 5054-5062, "Determination of the ion exchange capacity of anion-selective membrane." IEC is the inverse of "equivalent weight" or EW, which the weight of the polymer required to provide 1 mole of exchangeable protons.

"Anti-fog" refers to the prevention or inhibition of build-up of condensation on a surface (such as a lens or a window). Anti-fog property can be expressed by the value $T_{fog}$, which is the time it takes to form a fog on a surface. Anti-fog can be evaluated by exposing the layer (surface) to steam from boiling water at a 20 centimeter distance from the water's surface in an environment of 50% RH (relative humidity) and 22° C. For example, if the surface has a $T_{fog}$ of 30 minutes, it means that no fog is formed on a surface of said coating within 30 minutes under the testing conditions described.

"Effective amount" refers to an amount sufficient to alter, destroy, inactivate, and/or neutralize microbes, e.g., an amount sufficient to sterilize and kill the microbes.

"Microbes" refers to microorganisms including bacteria, archaea, fungi (yeasts and molds), algae, protozoa, and viruses, with microscopic size.

"High-touch Surfaces" refers to surfaces that are handled frequently throughout the day by numerous people (according definition of the US Centers for Disease Control and Prevention).

"Releasable" or "separable" bond in the context of layers or surfaces means that the layers or surfaces are generally attached or fastened to each other, yet can be separated with the application of a certain amount of force, and then subsequently refastened or reattached at a later time. In order to be "separable" or "releasable," the surfaces must be capable of being fastened and separated, and the force applied to separate the layers or surfaces can be applied by hand.

"Regenerating," "regeneration," or "reactivating," or "recharging" (and the passive form thereof) refers to a process to charge or recharge, or a state of being charged or recharged to enhance or restore the bio-secure properties to kill or inactivate microbes upon contact.

"Self-sterilizing" means a material, a composition, or an article with disinfecting properties, e.g., virucidal and bactericidal, with the capability to kill >99% of microbes and render them inert, or to essentially inhibit the attachment of microbes, upon contact in a short period of time, e.g., less than 120 minutes, less than 30 minutes, or less than 10 minutes, or less than 5 minutes, and with the capability to stay bio-secure for an extended period of time. In embodiments, the extended period of time is at least 2 hrs., or at least 4 hrs., or at least 12 hrs. The term self-sterilizing may be used interchangeably with antimicrobial, or bio-secure.

"Surface pH" refers to the pH on the contact surface of the antimicrobial top layer exposed to, being touched by, or being handled by people. The surface pH can be measured with commercial surface pH measuring instruments, e.g., SenTix™ Sur-electrode from WTW Scientific-Technical Institute GmbH, Weilheim, Germany.

"Substrate" or "substrates" for use herein refers to the high-touch surfaces to be protected with the self-sterilizing laminate structure disclosed herein.

"Haze" means the percentage of transmitted light that upon passing through a specimen is scattered greater than 2.5 degrees from the normal. Haze and transmittance can be measured according to ASTM D1003 test method. A higher haze value indicates greater scattering.

The disclosure relates to laminate structures to cover or protect substrates or surfaces, particularly high-touch surfaces such as door knobs, touch-screens, tables, etc., with a support layer and a self-sterilizing/antimicrobial layer comprising, consisting essentially of, or consisting a sulfonated polymer, capable of killing microbes within minutes and for an extended period of time. In embodiments, the laminate structure includes at least an adhesive layer, which can be positioned in between the antimicrobial layer and the support layer, or for attaching the support layer to the substrate. The key to the self-sterilizing characteristics of the laminate structures is a sulfonated polymer, or in embodiments, a selectively sulfonated negative-charged anionic block copolymer.

Self-sterilizing Material—Sulfonated Polymer: Sulfonated polymer refers to polymers having a sulfonate group, e.g., —SO_3, either in the acid form (e.g., —SO_3H, sulfonic acid) or a salt form (e.g., —SO_3Na). The term "sulfonated polymer" also covers sulfonate containing polymers, e.g., polystyrene sulfonate.

The sulfonated polymer is selected from the group of perfluorosulfonic acid polymers (e.g., sulfonated tetrafluoroethylene), sulfonated polyolefins, sulfonated polyimides, sulfonated polyamides, sulfonated polyester, polystyrene sulfonates, sulfonated block copolymers, sulfonated polyolefins, sulfonated polysulfones such as polyether sulfone, sulfonated polyketones such as polyether ether ketone, sulfonated polyphenylene ethers, and mixtures thereof.

The sulfonated polymer is characterized as being sufficiently or selectively sulfonated to contain from 10-100 mol % sulfonic acid or sulfonate salt functional groups based on the number of monomer units or the block to be sulfonated ("degree of sulfonation"), to kill at least 95% of microbes within 120 minutes of coming into contact with the coating material. In embodiments, the sulfonated polymer has a degree of sulfonation of >25 mol %, or >50 mol %, or <95 mol %, or 25-70 mol %. Degree of sulfonation can be calculated by NMR or ion exchange capacity (IEC).

In embodiments, the sulfonated polymer is a sulfonated tetrafluoroethylene, having a polytetrafluoroethylene (PTFE) backbone; (2) side chains of vinyl ethers (e.g., —O— CF_2— CF— O— CF_2—CF_2—) which terminate in sulfonic acid groups in a cluster region.

In embodiments, the sulfonated polymer is a polystyrene sulfonate, examples include potassium polystyrene sulfonate, sodium polystyrene sulfonate, a co-polymer of sodium polystyrene sulfonate and potassium polystyrene sulfonate (e.g., a polystyrene sulfonate copolymer), having a molecular weight of 20,000 to 1,000,000 Daltons, or >25,000 Daltons, or >40,000 Dalton, or >50,000, or >75,000, or >100,000 Daltons, or >400,000 Daltons, or <200,000, or <800,000 Daltons, or up to 1,500,000 Daltons. The polystyrene sulfonate polymers can either be crosslinked or uncrosslinked. In embodiments, the polystyrene sulfonate polymers are uncrosslinked and water soluble.

In embodiments, the sulfonated polymer is a polysulfone, selected from the group of aromatic polysulfones, polyphenylenesulfones, aromatic polyether sulfones, dichlorodiphenoxy sulfones, sulfonated substituted polysulfone polymers, and mixtures thereof. In embodiments, the sulfonated polymer is a sulfonated polyethersulfone copolymer, which can be made with reactants including sulfonate salts such as hydroquinone 2-potassium sulfonate (HPS) with other monomers, e.g., bisphenol A and 4-fluorophenyl sulfone. The degree of sulfonation in the polymer can be controlled with the amount of HPS unit in the polymer backbone.

In embodiments, the sulfonated polymer is a sulfonated polyether ketone. In embodiments, the sulfonated polymer is a sulfonated polyether ketone ketone (SPEKK), obtained by sulfonating a polyether ketone ketone (PEKK). The polyether ketone ketone can be manufactured using diphenyl ether and a benzene dicarbonic acid derivative. The sulfonated PEKK can be available as an alcohol and/or water-soluble product, e.g., for subsequent use to coat the face mask or in spray applications.

In embodiments, the sulfonated polymer is a sulfonated poly(arylene ether) copolymer containing pendant sulfonic acid groups. In embodiments, the sulfonated polymer is a sulfonated poly(2,6-dimethyl-1,4-phenylene oxide), commonly referred to as sulfonated polyphenylene oxide. In embodiments, the sulfonated polymer is a sulfonated poly (4-phenoxybenzoyl-1,4-phenylene) (S-PPBP). In embodiments, the sulfonated polymer is a sulfonated polyphenylene having 2 to 6 pendant sulfonic acid groups per polymer repeat, and characterized as having 0.5 meq (SO_3H)/g of polymer to 5.0 meq (SO_3H)/g polymer, or at least 6 meq/g (SO_3H)/g polymer.

In embodiments, the sulfonated polymer is a sulfonated polyamide, e.g. aliphatic polyamides such nylon-6 and nylon-6,6, partially aromatic polyamides and polyarylamides such as poly(phenyldiamidoterephthalate), provided with sulfonate groups chemically bonded as amine pendant groups to nitrogen atoms in the polymer backbone. The sulfonated polyamide can have a sulfonation level of 20 to up to 100% of the amide group, with the sulfonation throughout the bulk of the polyamide. In embodiments, the sulfonation is limited to a high density of sulfonate groups at the surface, e.g., >10%, >20%, >30%, or >40%, or up to 100% of the sulfonated amide group at the surface (within 50 nm of the surface).

In embodiments, the sulfonated polymer is a sulfonated polyolefin, containing at least 0.1 meq, or >2 meq, or >3 meq, or >5 meq, or 0.1 to 6 meq of sulfonic acid per gram of polyolefin. In embodiments, the sulfonated polymer is a sulfonated polyethylene. The sulfonated polyolefin can be formed by chlorosulfonation of a solid polyolefin obtained by polymerization of an olefin or a mixture of olefins selected from a group consisting of ethylene, propylene, butene-1,4-methylpentene-1, isobutylene, and styrene. The sulfonyl chloride groups can then be hydrolyzed, for example, in an aqueous base such as potassium hydroxide or in a water dimethylsulfoxide (DMF) mixture to form sulfonic acid groups. In embodiment, the sulfonated polyolefin is formed by submerging or passing polyolefin object in any form of powder, fiber, yarn, woven fabric, a film, a preform, etc., through a liquid containing sulfur trioxide (SO_3), a sulfur trioxide precursor (e.g., chlorosulfonic acid, HSO_3Cl), sulfur dioxide (SO_2), or a mixture thereof. In other embodiments, the polyolefin object is brought into contact with a sulfonating gas, e.g., SO_2 or SO_3, or gaseous reactive precursor, or a sulfonation additive that evolves a gas SO_x at elevated temperature.

The polyolefin precursor to be sulfonated can be, for example, a poly-α-olefin, such as polyethylene, polypropylene, polybutylene, polyisobutylene, ethylene propylene rubber, or a chlorinated polyolefin (e.g., polyvinylchloride, or PVC), or a polydiene, such as polybutadiene (e.g., poly-1, 3-butadiene or poly-1,2-butadiene), polyisoprene, dicyclopentadiene, ethylidene norbornene, or vinyl norbornene, or a homogeneous or heterogeneous composite thereof, or a copolymer thereof (e.g., EPDM rubber, i.e., ethylene propylene diene monomer). In embodiments, the polyolefin is selected from low density polyethylene (LDPE), linear low density polyethylene (LLDPE), very low density polyethylene (VLDPE), high density polyethylene (HDPE), medium density polyethylene (MDPE), high molecular weight polyethylene (HMWPE), and ultra-high molecular weight polyethylene (UHMWPE).

In embodiments, the sulfonated polymer is a sulfonated polyimide, e.g., aromatic polyimides in both thermoplastic and thermosetting forms, having excellent chemical stability and high modulus properties. Sulfonated polyimide can be prepared by condensation polymerization of dianhydrides with diamines, wherein one of the monomeric units contains sulfonic acid, sulfonic acid salt, or sulfonic ester group. The polymer can also be prepared by direct sulfonation of aromatic polyimide precursors, using sulfonation agents such as chlorosulfonic acid, sulfur trioxide and sulfur trioxide complexes. In embodiments, the concentration of sulfonic acid groups in the sulfonated polyimide as measured by ion exchange capacity, IEC, varying from 0.1 meq/g to above 3 meq/g, or at least 6 meq/g.

In embodiments, the sulfonated polymer is a sulfonated polyester, formed by directly sulfonating a polyester resin in any form, e.g., fiber, yarn, woven fabric, film, sheet, and the like, with a sulfuric anhydride-containing gas containing sulfuric anhydride, for a concentration of the sulfone group on the surface of the polyester ranging from 0.1 meq/g to above 3 meq/g, e.g., up to 5 meq/g, or at least 6 meq/g.

In embodiments, the sulfonated polymer is a selectively sulfonated negative-charged anionic block copolymer. The term "selectively sulfonated" definition to include sulfonic acid as well as neutralized sulfonate derivatives. The sulfonate group can be in the form of metal salt, ammonium salt or amine salt.

Depending on the applications and the desired properties, the sulfonated polymer can be modified (or funcationalized). In embodiments, the sulfonated polymer is neutralized with any of various metal counterions, including alkali, alkaline earth, and transition metals, with at least 10% of the sulfonic acid groups being neutralized. In embodiments, the sulfonated polymer is neutralized with inorganic or organic cationic salts, e.g, those based on ammonium, phosphonium, pyridinium, sulfonium and the like. Salts can be monomeric, oligomeric, or polymeric. In embodiments, the sulfonated polymer is neutralized with various primary, secondary, or tertiary amine-containing molecules, with >10% of the sulfonic acid or sulfonate functional groups being neutralized.

In embodiments, the sulfonic acid or sulfonate functional group is modified by reaction with an effective amount of polyoxyalkyleneamine having molecular weights from 140 to 10,000. Amine-containing neutralizing agents can be mono-functional or multi-functional; monomeric, oligomeric, or polymeric. In alternative embodiments, the sulfonated polymer is modified with alternative anionic functionalities, such as phosphonic acid or acrylic and alkyl acrylic acids.

In embodiments, amine containing polymers are used for the modification of the sulfonated polymers, forming members of a class of materials termed coaservates. In examples, the neutralizing agent is a polymeric amine, e.g., polymers containing benzylamine functionality. Examples include homopolymers and copolymers of 4-dimethylaminostyrene which has been described in U.S. Pat. No. 9,849,450, incorporated herein by reference. In embodiments, the neutralizing agents are selected from polymers containing vinylbenzylamine functionality, e.g., polymers synthesized from poly-p-methylstyrene containing block copolymers via a bromination-amination strategy, or by direct anionic polymerization of amine containing styrenic monomers. Examples of amine functionalities for functionalization include but are not limited to p-vinylbenzyldimethylamine (BDMA), p-vinylbenzylpyrrolidine (VBPyr), p-vinylbenzyl-bis(2-methoxyethyl)amine (VBDEM), p-vinylbenzylpiperazine (VBMPip), and p-vinylbenzyldiphenylamine (VBDPA). In embodiments, corresponding phosphorus containing polymers can also be used for the functionalization of the sulfonated polymers.

In embodiments, the monomer or the block containing amine functionality or phosphine functionality can be neutralized with acids or proton donors, creating quaternary ammonium or phosphonium salts. In other embodiments, the sulfonated polymer containing tertiary amine is reacted with alkylhalides to form functional groups, e.g., quaternized salts. In some embodiments, the sulfonated polymer can contain both cationic and anionic functionality to form so-called zwitterionic polymers.

In some embodiments, the sulfonated polymer is a selectively sulfonated negative-charged anionic block copolymer, which "selectively sulfonated" definition to include sulfonic acid as well as neutralized sulfonate derivatives. The sulfonate group can be in the form of metal salt, ammonium salt or amine salt. In embodiments, the sulfonated block polymer has a general configuration A-B-A, $(A-B)_n(A)$, $(A-B-A)_nX$, $(A-B)_nX$, A-D-B, A-B-D, A-D-B-D-A, A-B-D-B-A, $(A-D-B)_nA$, $(A-B-D)_nA$ $(A-D-B)_nX$, $(A-B-D)_nX$ or mixtures thereof; where n is an integer from 0 to 30, or 2 to 20 in embodiments; and X is a coupling agent residue. Each A and D block is a polymer block resistant to sulfonation. Each B block is susceptible to sulfonation. For configurations with multiple A, B or D blocks, the plurality of A blocks, B blocks, or D blocks can be the same or different.

In embodiments, the A blocks are one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof. If the A segments are polymers of 1,3-cyclodiene or conjugated dienes, the segments will be hydrogenated subsequent to polymerization of the block copolymer and before sulfonation of the block copolymer. The A blocks may also contain up to 15 mol % of the vinyl aromatic monomers such as those present in the B blocks.

In embodiments, the A block is selected from para-substituted styrene monomers selected from para-methyl styrene, para-ethylstyrene, para-n-propyl styrene, para-isopropyl styrene, para-n-butyl styrene, para-sec-butyl styrene, para-iso-butylstyrene, para-t-butylstyrene, isomers of para-decylstyrene, isomers of para-dodecylstyrene and mixtures of the above monomers. Examples of para-substituted styrene monomers include para-t-butylstyrene and para-methylstyrene, with para-t-butylstyrene being most preferred. Monomers may be mixtures of monomers, depending on the particular source. In embodiments, the overall purity of the para-substituted styrene monomers be at least 90%-wt., or >95%-wt., or >98%-wt. of the para-substituted styrene monomer.

In embodiments, the block B comprises segments of one or more polymerized vinyl aromatic monomers selected from unsubstituted styrene monomer, ortho-substituted styrene monomers, meta-substituted styrene monomers, alpha-methylstyrene monomer, 1,1-diphenylethylene monomer, 1,2-diphenylethylene monomer, and mixtures thereof. In addition to the monomers and polymers noted, in embodiments the B blocks also comprises a hydrogenated copolymer of such monomer (s) with a conjugated diene selected from 1,3-butadiene, isoprene and mixtures thereof, having a vinyl content of between 20 and 80 mol percent. These copolymers with hydrogenated dienes can be any of random copolymers, tapered copolymers, block copolymers or controlled distribution copolymers. The block B is selectively sulfonated, containing from about 10 to about 100 mol % sulfonic acid or sulfonate salt functional groups based on the number of monomer units. In embodiments, the degree of sulfonation in the B block ranges from 10 to 95 mol %, or 15-80 mol %, or 20-70 mol %, or 25-60 mol %, or >20 mol %, or >50 mol %.

The D block comprises a hydrogenated polymer or copolymer of a conjugated diene selected from isoprene, 1,3-butadiene and mixtures thereof. In other examples, the D block is any of an acrylate, a silicone polymer, or a polymer of isobutylene with a number average molecular weight of >1000, or >2000, or >4000, or >6000.

The coupling agent X is selected from coupling agents known in the art, including polyalkenyl coupling agents, dihaloalkanes, silicon halides, siloxanes, multifunctional epoxides, silica compounds, esters of monohydric alcohols with carboxylic acids, (e.g. methylbenzoate and dimethyl adipate) and epoxidized oils.

The antimicrobial and mechanical properties of the sulfonated block copolymer can be varied and controlled by varying the amount of sulfonation, the degree of neutralization of the sulfonic acid groups to the sulfonated salts, as well as controlling the location of the sulfonated group(s) in the polymer. In embodiments and depending on the applications, e.g., one with the need for water dispersity/solubility, or at the other spectrum, one with the need for sufficient durability with constant wiping with water based cleaners, the sulfonated block copolymer can be selectively sulfonated for desired water dispersity properties or mechanical properties, e.g., having the sulfonic acid functional groups attached to the inner blocks or middle blocks, or in the outer blocks of a sulfonated block copolymer, as in U.S. Pat. No. 8,084,546, incorporated by reference. If the outer (hard) blocks are sulfonated, upon exposure to water, hydration of the hard domains may result in plasticization of those domains and softening, allowing dispersion or solubility.

The sulfonated copolymer in embodiments is as disclosed in Patent Publication Nos. U.S. Pat. Nos. 9,861,941, 8,263, 713, 8,445,631, 8,012,539, 8,377,514, 8,377,515, 7,737,224, 8,383,735, 7,919,565, 8,003,733, 8,058,353, 7,981,970, 8,329,827, 8,084,546, 8,383,735, U.S. Ser. No. 10/202,494, and U.S. Ser. No. 10/228,168, the relevant portions are incorporated herein by reference.

In embodiments, the sulfonated block copolymer has a general configuration A-B-(B-A)$_{t-5}$, wherein each A is a non-elastomeric sulfonated monovinyl arene polymer block and each B is a substantially saturated elastomeric alpha-olefin polymer block, said block copolymer being sulfonated to an extent sufficient to provide at least 1% by weight of sulfur in the total polymer and up to one sulfonated constituent for each monovinyl arene unit. The sulfonated polymer can be used in the form of their acid, alkali metal salt, ammonium salt or amine salt.

In embodiments, the sulfonated block copolymer is a sulfonated polystyrene-polyisoprene-polystyrene, sulfonated in the center segment. In embodiments, the sulfonated block copolymer is a sulfonated t-butylstyrene/isoprene random copolymer with C=C sites in their backbone. In embodiments, the sulfonated polymer is a sulfonated SBR (styrene butadiene rubber) as disclosed in U.S. Pat. No. 6,110,616 incorporated by reference. In embodiments, the sulfonated polymer is a water dispersible BAB triblock, with B being a hydrophobic block such as alkyl or (if it is sulfonated, it becomes hydrophilic) poly(t-butyl styrene) and A being a hydrophilic block such as sulfonated poly(vinyl toluene) as disclosed in U.S. Pat. No. 4,505,827 incorporated by reference. In embodiments, the sulfonated block copolymer is a functionalized, selectively hydrogenated block copolymer having at least one alkenyl arene polymer block A and at least one substantially completely, hydrogenated conjugated diene polymer block B, with substantially all of the sulfonic functional groups grafted to alkenyl arene polymer block A (as disclosed in U.S. Pat. No. 5,516,831, incorporated by reference). In embodiments, the sulfonated polymer is a water-soluble polymer, a sulfonated diblock polymer of t-butyl styrene/styrene, or a sulfonated triblock polymer of t-butyl styrene-styrene-t-butyl styrene as disclosed in U.S. Pat. No. 4,492, 785 incorporated by reference. In embodiments, the sulfonated block copolymer is a partially hydrogenated block copolymer.

In embodiments, the sulfonated polymer is a midblock-sulfonated triblock copolymer, or a midblock-sulfonated pentablock copolymer or, e.g., a poly(p-tert-butyl styrene-b-styrenesulfonate-b-p-tert-butylstyrene), or a poly[tert-butylstyrene-b-(ethylene-alt-propylene)-b-(styrenesulfonate)-b-(ethylene-alt-propylene)-b-tert-butylstyrene.

In embodiments, the sulfonated polymer contains >15 mol %, or >25 mol %, or >30 mol %, or >40 mol %, or >60 mol % sulfonic acid or sulfonate salt functional groups based on the number of monomer units in the polymer that are available or susceptible for sulfonation, e.g., the styrene monomers.

In embodiments, the sulfonated polymer has an ion exchange capacity of >0.5 meq/g, or >0.75 meq/g, or >1.0 meq/g, or >1.5 meq/g, or >2.0 meq/g, or >2.5 meq/g, or <5.0 meq/g.

Optional Components for the Self-Sterilizing Layer: In embodiments, in addition to the sulfonated polymer, the antimicrobial layer further comprises additives, e.g., an end-of-service indicator to provide visual indication prompting the user to replace the antimicrobial film.

In embodiment, end-of-service indicator is incorporated in the form of adding a color change pH indicator to the sulfonated polymer composition. Examples of a pH indicator include Thymol Blue, Methyl Orange, Bromocresol Green, Methyl Red, Bromothymol Blue, Phenol Red, and Phenol-phthalein. A color change means a change in hue, from a light to a darker color or vice versa. If a color indicator is incorporated, a chart can be provided to indicate if a recharge, regeneration, or reactivation of the antimicrobial layer or a new antimicrobial layer is needed. The color indicator is incorporated in a sufficient amount so that a noticeable change in color hue is observed immediately when there is a change in the effectiveness of the bio-secure material, e.g., when its surface pH is increased above 2.0.

In embodiments, the end-of-service indicator is applied just as a small portion on the surface, e.g., as a label or paint to the corners of the antimicrobial film after the antimicrobial film has been formed on a surface.

In addition to the above optional components, other additives such as plasticizers, tackifiers, surfactants, film forming additives, dyes, pigments, cross-linkers, UV absorbers, catalysts, highly conjugated particles, sheets, or tubes (e.g. carbon black, graphene, carbon nanotubes), etc. may be incorporated in any combination to the extent that they do not inhibit the efficacy of the material.

Properties of Sulfonated Polymer: In embodiments, the sulfonated polymer in the protective layer is characterized as being sufficiently sulfonated to have an IEC of >0.5 meq/g, or 1.5-3.5 meq/g, or >1.25 meq/g, or >2.2 meq/g, or >2.5 meq/g, or >4.0 meq/g, or <4.0 meq/g.

In embodiments, the sulfonated polymer is characterized as having a surface pH of <3.0, or <2.5, or <2.25, or <2.0, or <1.80.

In use as a self-sterilizing protective layer, it is believed that that the sulfonic acids in the layer interact with the functionality in the microbes and kill microorganisms that come in contact with the surface, including bacteria, viruses, algae, mold, mildew, and fungi in the environment (e.g., air or water). For example, in the context of SARS-CoV-2 virus, it is postulated that the sulfonated polymer with exposed ionic domains in the sulfonic acid functional groups immobilize/sequester via interactions with the spike glycoproteins as they are sugar coated and thus highly polar.

In embodiments, the self-sterilizing protective layer works effectively in destroying/inactivating >90%, >95%, >99%, or >99.5%, or >99.9% of microbes within <120 minutes of contact, or <30 minutes, or <5 minutes of contact, for microbes including but not limited to SARS-CoV-2, methicillin-resistant *Staphylococcus aureus* (MRSA), X-MulV, PI-3, vancomycin-resistant *Enterococcus faecium*, carbapenem-resistant *Acinetobacter baumannii*, and influenza A virus. In embodiments with sulfonated polymer containing quaternary ammonium group as disclosed in US Patent Publication Nos. U.S. Ser. No. 10/202,494, US20140197032, and US20130015071, incorporated herein by reference, the material is effective in killing target microbes including *Staphylococcus aureus, Escherichia coli, Staphylococcus albus, Escherichia coli, Rhizoctonia solani*, and *Fusarium oxysporum*.

Depending on the final application and/or the type of support layer, the antimicrobial layer is applied as a layer of <1000 μm, or >1 mm, or >5 μm, or >10 μm, or <500 μm, or <200 μm, or <100 μm, or 1 to 1000 μm, or 1 to 500 μm, or 1 to 200 μm, or 1 to 100 μm for a self-sterilizing surface.

In addition to the self-sterilizing properties, the layer also exhibits anti-fog property, having a $T_{fog}$ of >5 minutes, i.e., no fog is formed on a surface of said coating within about 5 minutes. In embodiments, the $T_{fog}$ is at least 15 minutes, or at least 30 minutes.

In some embodiments, the antimicrobial layer is also a transparent film, which allows the aesthetic qualities of the underlying surface to be visually observed through the antimicrobial layer. Transparency refers to optical clarity, meaning that enough light is transmitted through to allow visualization through the film by an observer. Although some haze or coloration may be presented, such haze or coloration does not substantially interfere with visualization. In embodiments, the antimicrobial layer has a transmission rate of at least 90%, or at least 91%; with a haze value of <1.5, or <1.25, or <1.0, or <0.75; and clarity of at least 99% or 99.5%. This is in comparison with clear acrylic control layers having transmission of 94.5%, haze of 0.1, and clarity of 100%.

Support Layer: The antimicrobial layer is disposed on a support layer. The support layer in embodiments is selected so as to provide the desired level of flexibility, adhesion between the antimicrobial layer and the support layer (with or without an adhesive), adhesion between the support layer and substrate (with or without an adhesive if the antimicrobial layer is not to be laminated directly onto the substrate), and/or the desired compatibility with an adhesive. As such the choice of support layer composition will vary depending on the desired properties, including desired flexibility, transparency (depending of the application if desired), releasability, and transferability as described below.

In embodiments, suitable materials for use in a substantially transparent support layer include, for example, polycarbonate, acrylic, vinyl, styrene-based films, polyvinylchloride, polybisallyl carbonate, polyethylene terephthalate, polyethylene films, polystyrene films, and sub-stantially transparent polyethylene naphthenate, as well as combinations comprising at least one of the foregoing types of polymers. Various polyolefins or fluorinated polymers can also be used. In embodiments, the support layer comprises a bi-axially oriented polypropylene (BOPP), giving a film layer with good clarity, flexibility, resistance to UV light and a smooth surface. The BOPP film can be provided with coatings, e.g., such as silicone for releasability, adhesive for adhesion to a surface, clear or matte form. In embodiments, the support layer comprises a high-density polyethylene (HDPE) for slip resistance and release property, which can be clear or opaque. In other embodiments, the support layer comprises Mylar or biaxially-oriented polyethylene terephthalate (BoPET) for its high tensile strength, chemical and dimensional stability, transparency, reflectivity, gas and aroma barrier properties.

For applications wherein a transparent support layer is not needed, the support layer can be made from spun or nonwoven substrate material made of natural or synthetic polymers, e.g., synthetic polymers such as rayon polyester, polyethylene terephthalate (PET), polyvinyl chloride, polyacrylamide, polystyrene, polyether-sulfone, acrylics and acrylic copolymers, rayon, polyolefins (e.g., polypropylene), and combinations thereof; natural polymers can include poly(lactic acid) (PLA), poly(glycolic acid) (PGA), wood pulp, cotton, cellulose, rayon, and combinations thereof.

In embodiments, the surface of the support layer may be treated to improve adhesion to the antimicrobial layer and/or the substrate for protection, if the support layer is to be applied onto the substrate, for example with an adhesive, by mechanical roughening, plasma treatment, chemical etching, and/or other known treatment(s).

The thickness of the support layer depends on the final application, e.g., whether the support layer is intended for use just as a liner, or as a middle layer between the antimicrobial layer and the substrate to be protected, or as the substrate to be protected by the antimicrobial layer itself (e.g., in some applications as a self-sterilizing wrap). In embodiments, the thickness is >0.1 mil, or >0.5 mil, or >1 mil, or >10 mil, or >20 mil, or <500 mil, or 0.1 to 500 mil, or 0.1 to 400 mil, or 0.1 to 300 mil, or 0.5 to 500 mil, or 1 to 500 mil.

It should be noted that in some embodiments, multiple support layers can be used (and optionally sealed at the edges or forming "ridges") for increased durability and support for the antimicrobial layers, particularly for applications as sterilizing wraps.

Optional Releasable Liner(s): In embodiments, either or both the support layer and the antimicrobial layer are provided with a releasable protective liner. The releasable liner comprises a release material, e.g., a silicone, to coat the surface of the side in contact with the antimicrobial layer (or the support layer). In embodiments, the releasable liner comprises a paper layer or a vinyl layer having a low tack adhesive applied thereon.

In embodiments, the antimicrobial layer is provided with a protective releasable liner, which can be removed after the laminate structure is positioned in place (covering or protecting a substrate). In embodiments, the support layer is provided with a protective release liner, which is first removed before the support layer is positioned onto a substrate for protection.

The releasable liner in one embodiment has a thickness ranging from 50 microns to 200 μm, or 50 to 200 μm, or 75 to 150 μm, or >50 μm or <300 μm.

Optional Adhesive Layer: In some embodiments with the support layer provided in the form of a static-cling layer for the protection of substrates such as a glass door or window, the support layer is provided with a low-tack pressure sensitive adhesive layer (also known as LTPSA, not shown in any of the Figures) such as a pressure sensitive acrylic adhesive. A LTPSA does not lock-up or become permanently affixed to the substrate, and does not leave a residue on the substrate when the laminate structure is removed/replaced with a new one. The LTPSA layer remains with the support layer when the laminate structure is peeled from the substrate. In embodiments, a high-tack pressure sensitive adhesive (HTPSA) layer is provided between the antimicrobial layer and the support layer, for the antimicrobial layer to remain in place strongly adhered to the support layer.

In embodiments where the antimicrobial layer is to be placed directly on the substrate, the LTPSA is to be applied between the antimicrobial layer and the support layer (for use as a releasable liner), for the support layer to be peeled off when the laminate structure is placed onto a substrate. The LTPSA also helps keep the antimicrobial layer in place on the substrate (after the support layer is peeled of), but still positionable and repositionable if needed.

In should be noted that multiple adhesive layers can be employed, e.g., a HTPSA layer between the antimicrobial layer and the support layer, and a LTPSA for the support layer surface in contact with the substrate, allowing the support layer to be positionable and repositionable.

In embodiments, the adhesive layer between the antimicrobial layer and the support layer is any type of known adhesive such as a pressure sensitive adhesive, a permanent adhesive, adhesives that cure with time, light-activated adhesives that cure with electromagnetic energy such as UV or visible light, heat-activated adhesives, cross-linked polymeric adhesive, or a non-crosslinked polymeric adhesive. An example of a laminate construct of the present invention comprises a pressure sensitive adhesive as the adhesive layer.

Pressure-sensitive adhesives are generally chemically composed of rubber-resin materials, acrylic resins, polyurethane, silicone resins, natural polymer, for example casein, and the like. Amongst the various patent literature describing compositions and improvements in pressure-sensitive adhesive formulations are U.S. Pat. Nos. RE24,906; 2,652,351; 3,740,366; 3,299,010; 3,770,708; 3,701,758; 3,922,464; 3,931,087; 4,012,560; 4,077,926; 4,387,172; 4,418,120; 4,629,663; and the like, incorporated by reference.

In embodiments, the adhesive can be applied to the edges of the laminate structure components e.g., liner, support layer, antimicrobial layer, etc. In embodiments, the adhesive can be applied to the edges of the laminate to attach the liner.

The optional adhesive layers if present, can be 0.1 to 5 mils in thickness, or 0.8 to 5 mils in thickness, with a peel force of 200 to 900 grams per inch.

Methods for Forming Laminate Structure: The antimicrobial layer can be disposed on the support layer by a variety of methods, including but not limited to casting, coating (e.g., wire wound rod coating, gravure coating, slot die coating, pan fed reverse roll coating, and nip-fed coating), and the like. In embodiments, the antimicrobial layer can be disposed onto the support layer by any of spraying, knife coating, roll coating, curtain coating, spin coating, immersion coating, dip coating, and combinations thereof. The technique is selected so as to provide a uniform and thick coating, e.g, an antimicrobial coating having a thickness of 2 to 5,000 or 25 to 500 μm, or 100 to 200 μm, or at least 50 μm, or <2500 μm.

In embodiments, the sulfonated polymer forming the antimicrobial layer is provided as any of a solution (e.g., in a suitable carrier or solvent), a gel, a foam, a spray, an emulsion, or a laminate (by wet bonded, thermally bonded, or adhesively bonded), for a layer having sufficient surface thickness for prolonged bio-secure properties. Where an organic solvent is used as a carrier, the solvent may be removed during or after cure by evaporation, for example in an oven, in a one- or multi-stage process. In embodiments, the solvent for use with the antimicrobial material is selected from aprotic polar solvents including ethers, amides, esters, ketones, nitriles, tertiary amines, sulfates and sulfoxide. In embodiments, the solvent is selected from aliphatic hydrocarbons like cyclohexane, in aromatic hydrocarbons like toluene, or alcohols like methanol, ethanol, propanol, benzyl alcohol and the like, in various carbonyl solvents like methylethylketone, acetone, etc., or in a nitrogen containing solvents like N-methyl pyrolidone, N,N-dimethyl acetamide, pyridine, etc. In embodiments, mixtures of solvents can be used as long as homogeneous solutions or stable suspensions in the presence of the sulfonated polymer can be made. In embodiments, the solvent may be removed by air-drying, thermal heating, microwave exposure, or infrared wavelengths.

In embodiments, the sulfonated polymer is applied directly onto a peel-and-stick substrate, e.g., a laminate of a layer and a release surface. The peel-and-stick substrate may be commercially available as rolls or sheets of material, e.g., wall paper rolls, masking tapes, protective tapes, protective film, etc., having a peel-back, a removable liner substrate and a pressure sensitive layer coated or deposited on substantially the entire surface of the release liner, which is releasably bonded to the releasable liner.

The sulfonated polymer is applied onto a peel-and-stick substrate by any of spray coating, casting, and gravure printing. In some embodiments, the sulfonated polymer is applied onto the substrate by electrospinning forming a microfiber or nanofiber layer on the pre-made peel-and-stick substrate. After the peel-and-stick substrate is coated with the sulfonated polymer, it can be cut into size for packaging.

Applications & Methods for Applying the Self-sterilizing Laminate Structure: The laminate structure with the self-sterilizing protective film can be used for application to touch points such as light switches, pens, door handles, hand rails, grab rails, intravenous poles, dispensers (e.g., water, gel, alcohol, soap, drinks, etc.), call buttons, elevator buttons, countertops, tables, food preparation surfaces in restaurants, splash guards and conveyor belts in food processing plants, public facilities, display applications, and a variety of surfaces in healthcare settings. In embodiment, the laminate structure can be used as is, e.g., a self-sterilizing wrap, or made into a self-sterilizing pouch or package.

In embodiments, the laminate structure is removable, repositionable, and transferable away from the substrate, if desired. In some applications, the laminate structure may be held in place by mechanical devices, including tracks in a frame, or other methods. Depending on the desired application, existing surface and/or host substrate, the laminate structure can be applied as is, e.g., a peel-and-stick on application. In other embodiments, the laminate structure may be removably adhered to the substrate electrostatically or adhesively (with a light adhesive allowing removal without leaving little if any residue).

For certain surfaces, the substrate can be first treated with heat, or a solvent, or an adhesive, to prepare the host substrate before the laminate structure is applied. For high-traffic applications, e.g., a grab rail, a subway railing, etc., the laminate structure can be pre-formed that can be bolted in place for secure attachment. In the case of metal substrates, it has been shown to be advantageous for bonding to apply a thin layer of water onto either the substrate and/or the polymer film prior to bonding.

In embodiments, the laminate structure can be removed from the substrate without leaving a residue or damaging the substrate. In embodiments, the laminate structure can be positionable and repositionable on the substrate.

The laminate structure can be available in varying dimensions, small rectangular sheets can be used for pull handle on doors, lighting switch plates, transparent facemasks, etc. Long and thin sheets or rolls would be appropriate for railings, conference tables, examining tables, etc. Smaller and/or irregularly shaped products can be mass-manufactured with molds.

Laminate structure: The self-sterilizing structure in embodiments comprises at least two layer as shown in FIG. 1, an antimicrobial layer 20 and a second layer or a support layer 30. The antimicrobial layer 20 is in contact substantially with all of the surface of one side of the support layer 30. The antimicrobial layer 20 is for covering a substrate 10 (e.g., the high touch surface) as shown in FIG. 2.

Figures 3, 4:
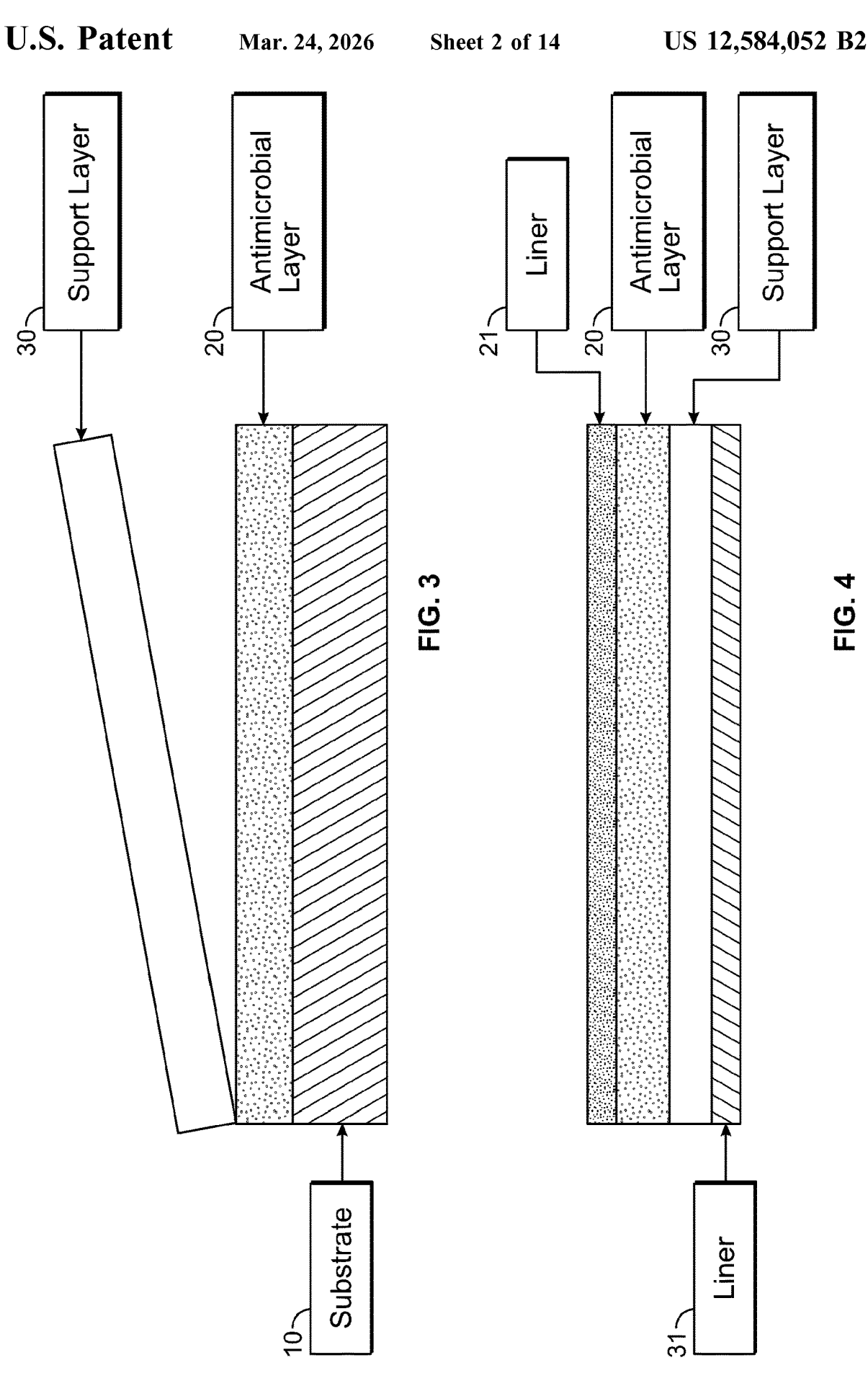
FIG. 3 is a side view of an embodiment of a laminate structure, with the support layer being a protective release which can be removed after the substrate is covered by the antimicrobial layer.
FIG. 4 a side view of an embodiment of a laminate structure, with a support layer and an antimicrobial layer, and protective liners for the support layer and the antimicrobial layer respectively.
Figure 7:
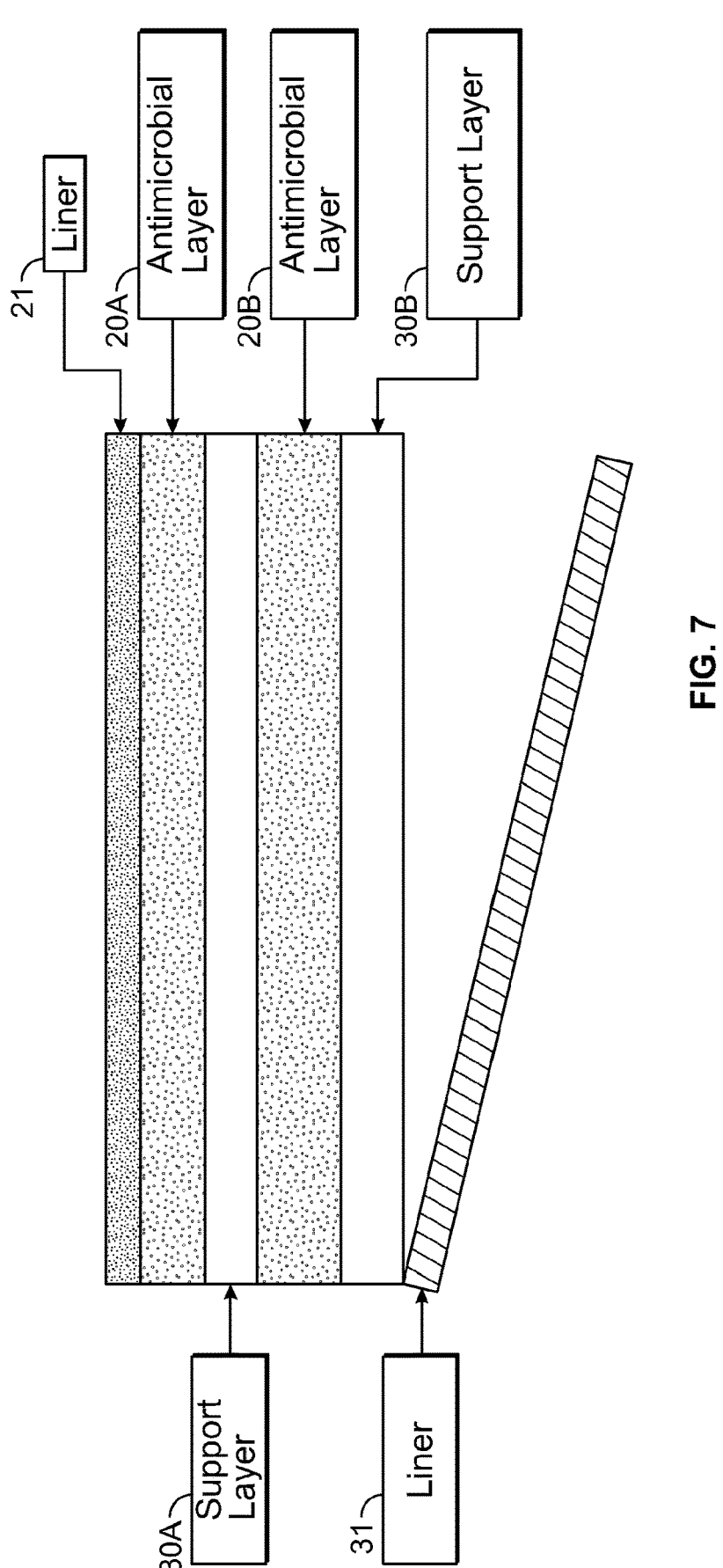
FIG. 7 is a side view of the multi-layer structure in FIG. 6, as the protective liner for the support layer is being peeled off prior to covering a substrate (not shown).
Figure 8:
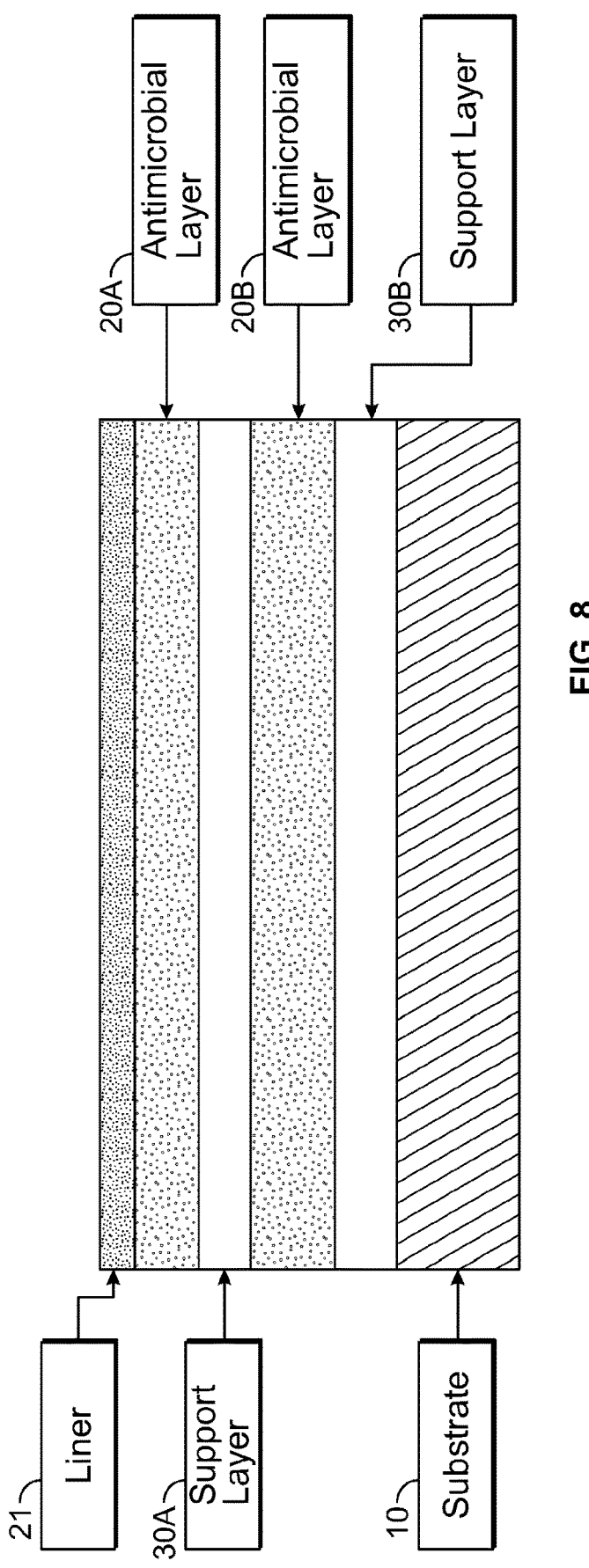
FIG. 8 is a side view of the multi-layer structure in FIG. 6, as the laminate structure (with two antimicrobial layers) is being placed onto a substrate.

In one embodiment as illustrated in FIG. 3, the antimicrobial layer is applied directly onto the substrate. The antimicrobial layer as a film is exposed to water and dried onto a polar or active metal surface as disclosed in US Publication No. US20130108880A1, incorporated herein by reference. After the application of the substrate, the support layer is released or peeled off exposing the antimicrobial layer for protection.

When in use, the antimicrobial layer 20 is exposed to the environment and being self-sterilizing in nature. With use or over time, if the antimicrobial layer becomes less effective or has to be regenerated, the existing antimicrobial layer 20 (and support layer 30 if present) is peeled off, and a new laminate structure is put on as a replacement.

In embodiments, either or both the antimicrobial layer and the support layer can have an optional structural element, e.g., a release liner that is releasably bonded to the antimicrobial layer or the support layer, for protection (FIG. 4). The release/protective liner is removed prior to covering a substrate with the laminate structure as shown in FIG. 5.

In some embodiments with the release liner(s) or embodiments wherein the antimicrobial layer can be peeled off from the support layer, the structure is characterized as having differential release forces between the layers to allow one layer in the structure to be peeled off from another layer. By differential release, it is meant that under a specific peeling force, one layer will release and the other layer will not. To achieve the force difference, the layers (or liners) can be coated with different release agents or materials that provide the differential release. The use of liners and/or differential release aids the operation to apply the laminate structure to protect the substrate, such that a liner can be peeled off to expose the support layer (having the antimicrobial layer bonded thereto) which then bonds to the substrate intended to be protected, or for a liner/a support layer to be peeled off after the antimicrobial covers and adheres to the substrate to be protected.

In embodiments, the laminate is structured such that there can be multiple layers of antimicrobial layers as showed in FIGS. 6-10. In FIG. 6, the laminate structure has two antimicrobial layers 20A and 20B, separated by support layer 30A. When applied onto a substrate (not shown) as in FIG. 7, liner 31 can be removed for the support layer 30B to be releasable bonding to the substrate.

Figure 9:
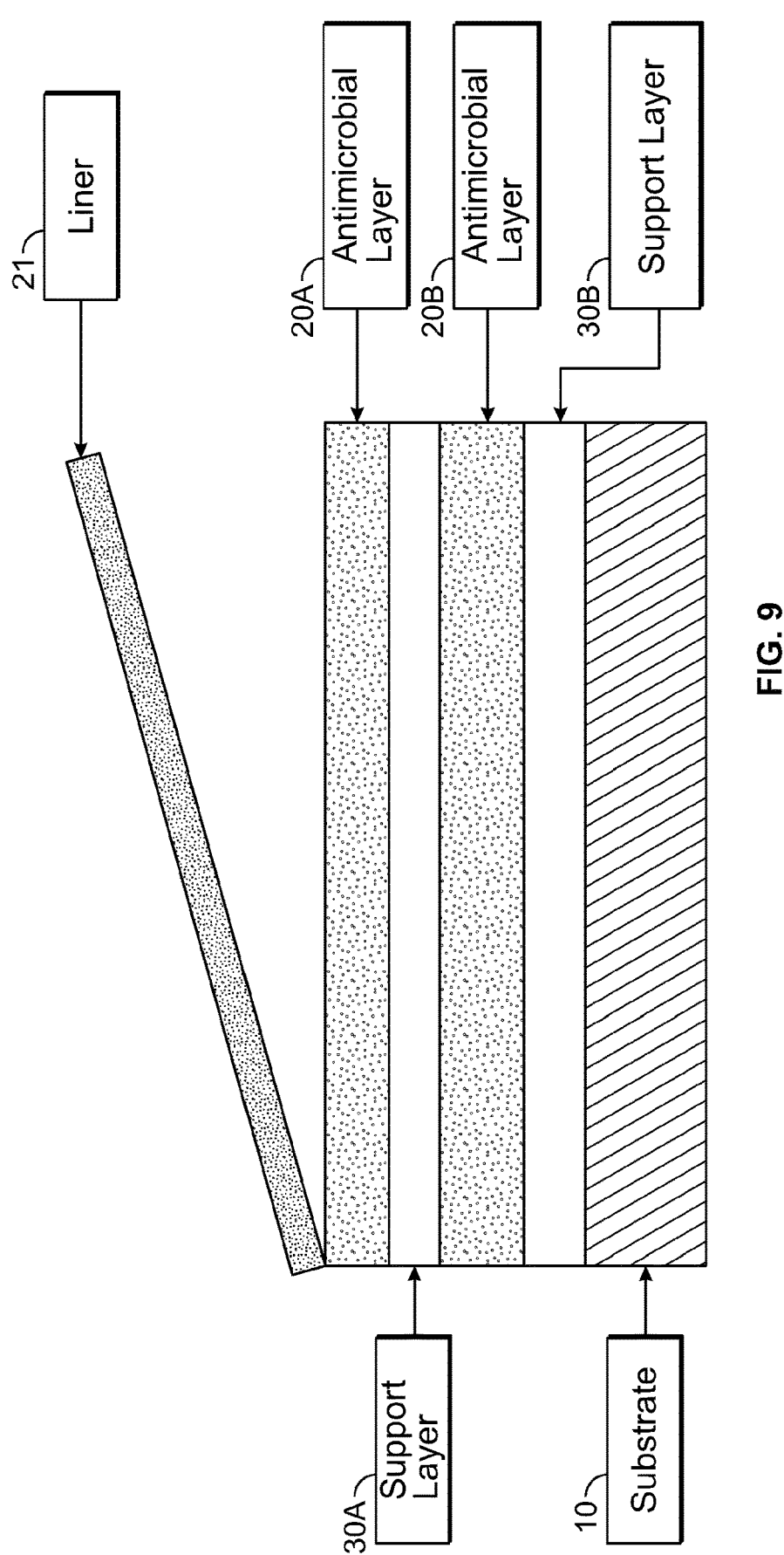
FIG. 9 is a side view of the multi-layer structure in FIG. 6, as the protective liner for the antimicrobial layer is being peeled off after the laminate structure is securely placed onto a substrate.
Figure 10:
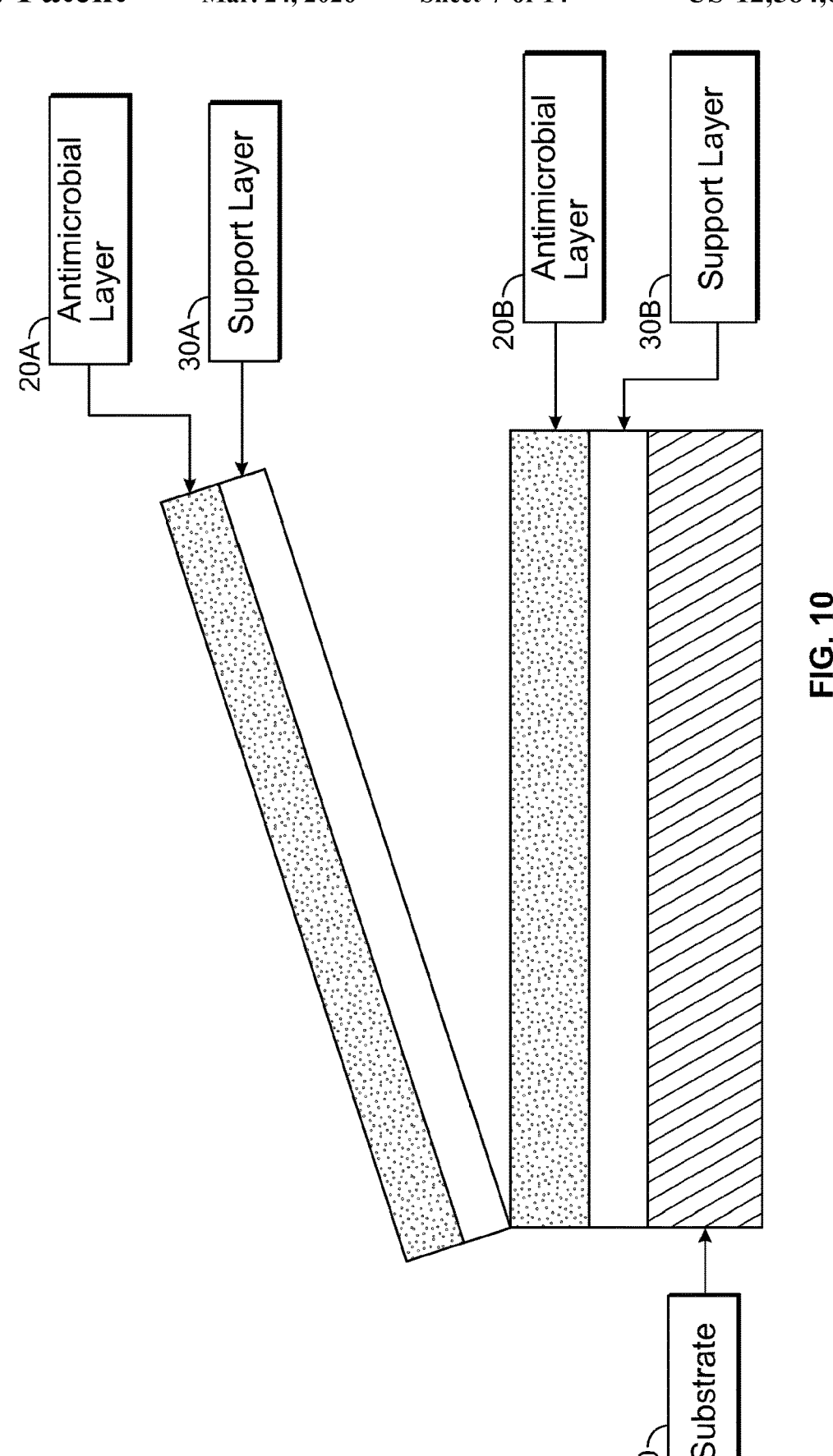
FIG. 10 is a side view of the multi-layer structure in FIG. 6, as the top two-layers (antimicrobial layer and support layer) are peeled off, exposing a new antimicrobial layer.

After being applied onto a substrate (FIG. 8), liner 21 is removed in FIG. 9, exposing the antimicrobial layer 20A for killing microbes upon contact. As shown in FIG. 10, after a period of time if it is desired to remove and replace the antimicrobial layer 20A, the two top layers—the antimicrobial layer 20A and the support layer 30A can be peeled off, exposing a "new" antimicrobial layer 20B for protecting the substrate 10.

Figure 11:
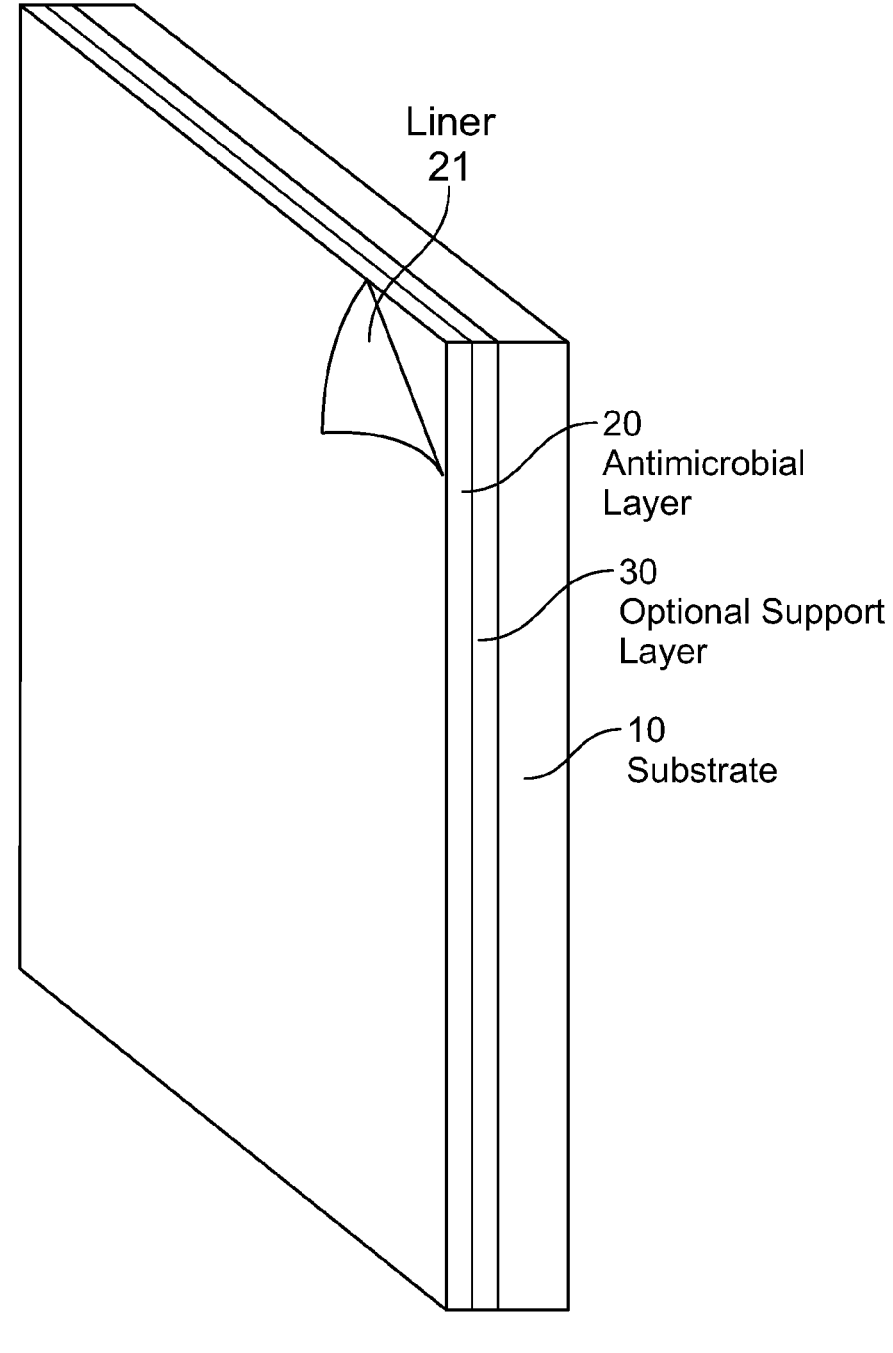
FIG. 11 is a perspective view illustrating an embodiment of a substrate protected by a laminate structure with a protective removable liner for the antimicrobial layer.
Figure 12:
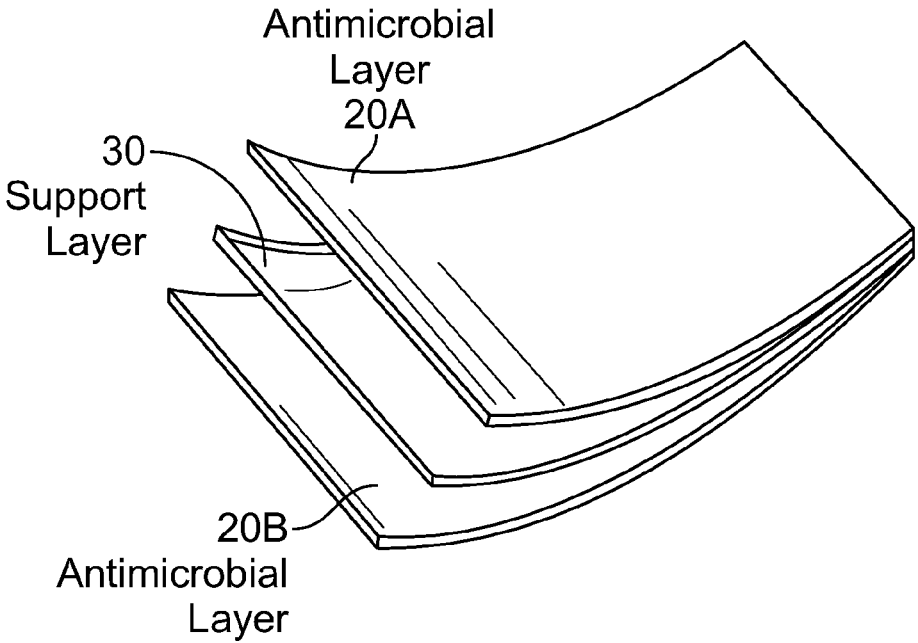
FIG. 12 is a perspective view of a laminate structure having three layers, a support layer in between two antimicrobial layers.
Figure 13:
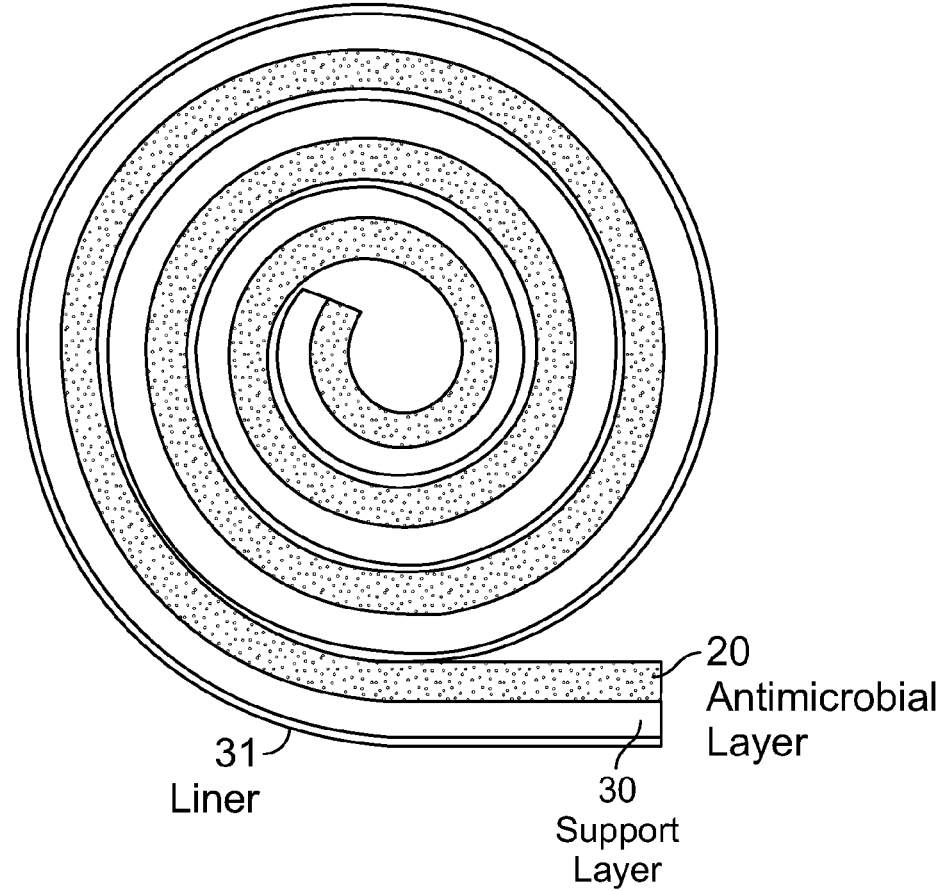
FIG. 13 is a schematic side view of a roll of laminates having a protective liner for the support layer.

The laminate structure can be made available in sheet form that can but cut to size to fit or cover the substrate to be protected (FIG. 11). It can be made available with or without a protective/releasable bond liner, and it can be made with a single or multiple antimicrobial layers (FIG. 12). It can also be made available in a roll form (FIG. 13) of a laminate structure having two or more layers, with at least one of the layers being the antimicrobial layer.

Figure 14:
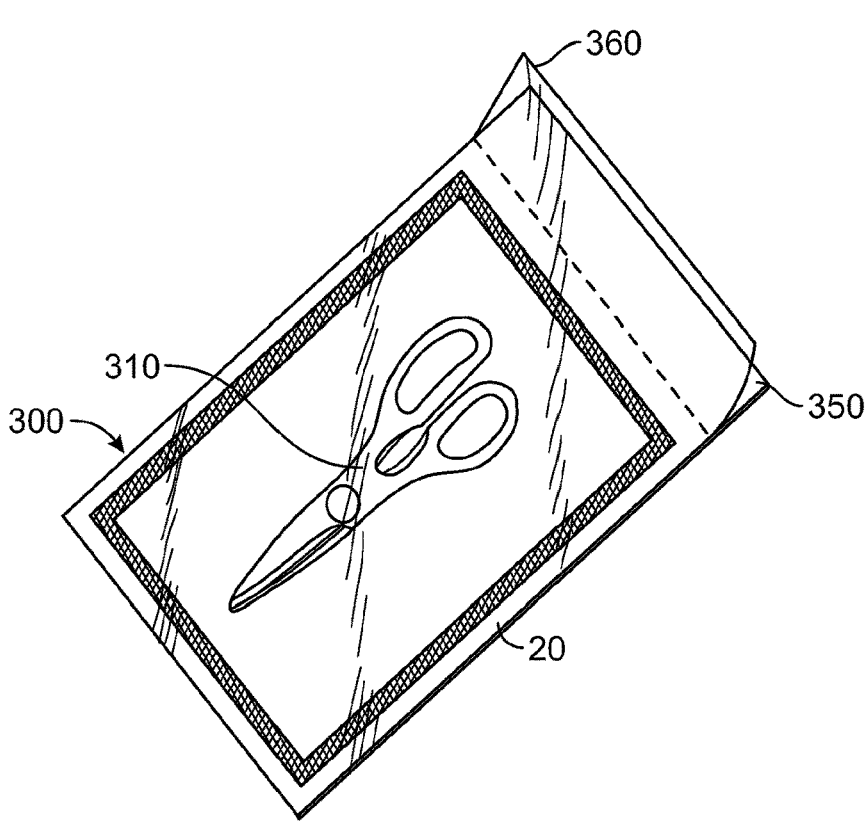
FIG. 14 illustrates an embodiment using the laminate structure in a self-sterilizing pouch for surgical instruments.

The laminate structure in embodiments are suitable for use as sterilizing pouches or wraps, for the protection of surgical or dental instruments in a medical or dental environment as shown in FIG. 14-17. In FIG. 14, the antimicrobial layer can be used for the inside of sterilizing pouch 300, as a protective layer on top of either or both bottom surface 350 and top surface 360, for the protection of instrument 310 contained within. A transparent layer can also be used to protect the outside of pouch 300, for laminating or covering the top transparent surface 350 of the pouch.

Figure 15:
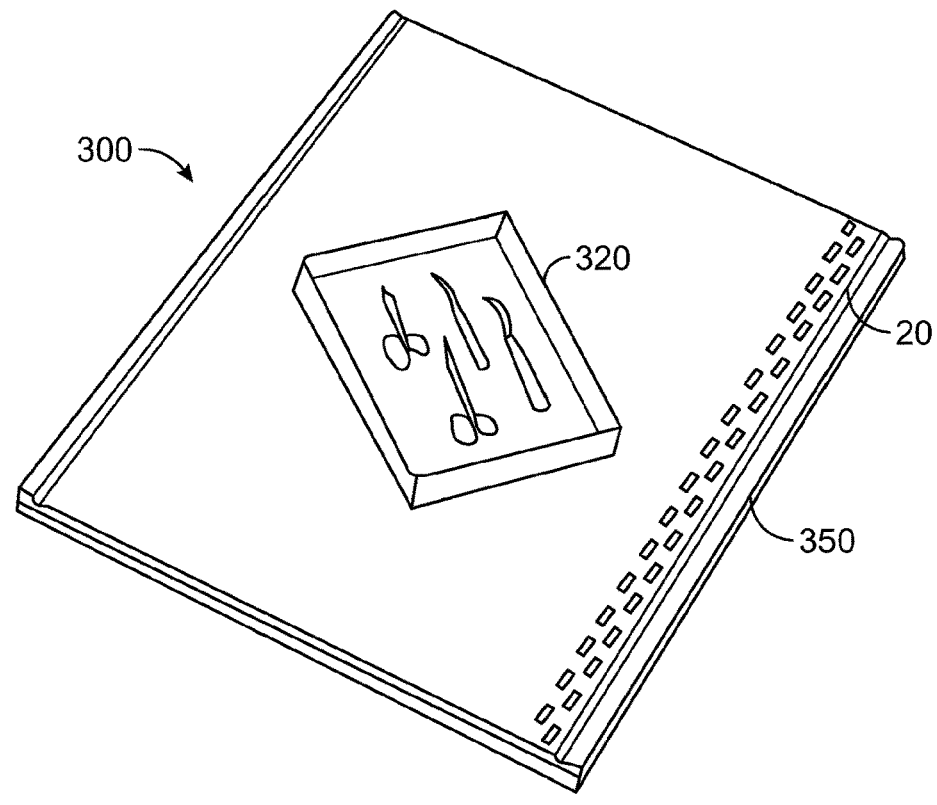
FIG. 15 illustrates an embodiment using the laminate structure as a coating cover for a self-sterilizing wrap.
Figure 16:
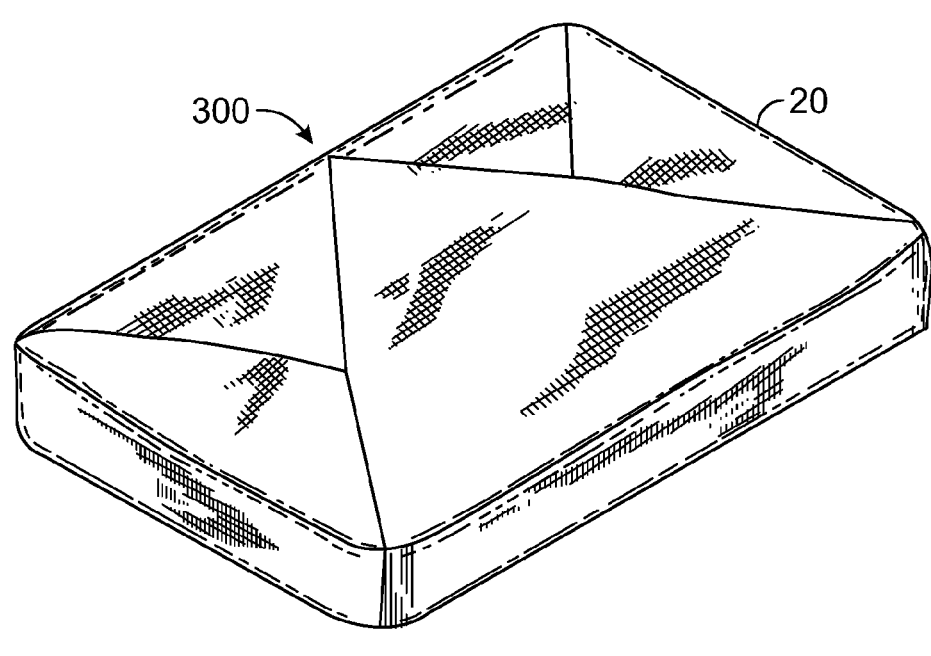
FIG. 16 is a perspective view of the self-sterilizing material for use as a package wrap.
Figure 17:
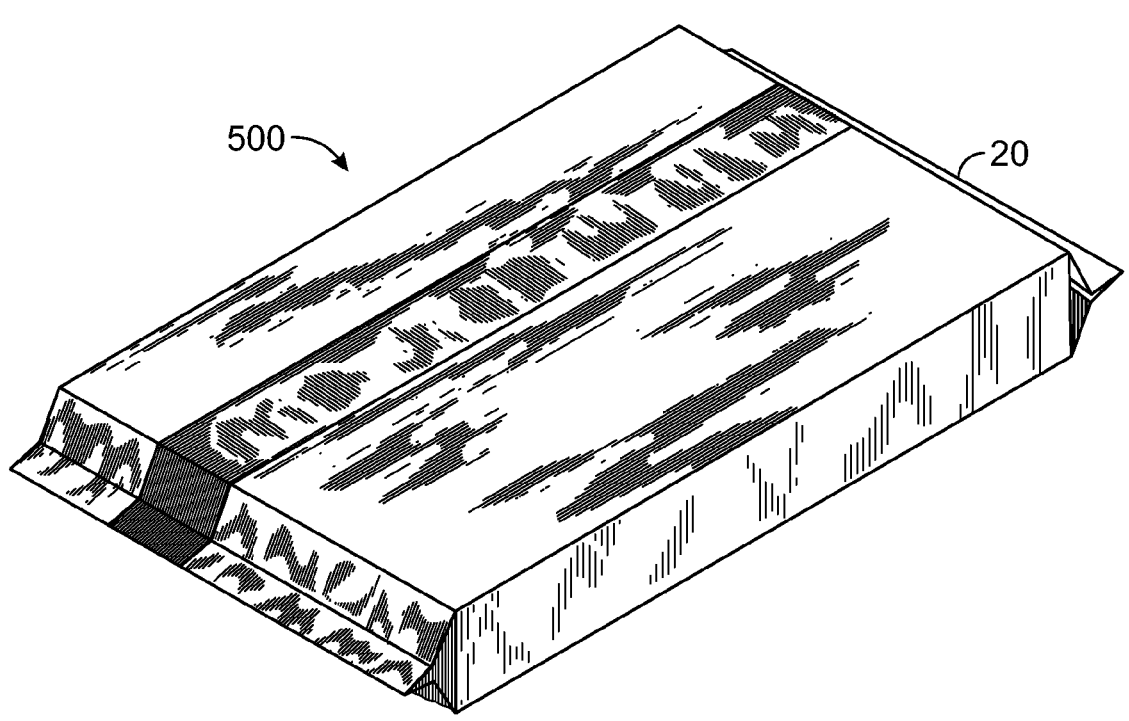
FIG. 17 is a perspective view of another application of the laminate structure, as made into a sterilizing package.

In FIG. 15, the laminate structure is used for the protection of a sterilizing wrap 300, for wrapping surgical instruments (in tray 320) for sterilization, transportation or storage. As shown, the antimicrobial layer is laminated onto the "inner" wrap 350. In FIG. 16, the antimicrobial layer is laminated onto the outer wrap (i.e., the bottom outer layer of sterilizing wrap 300 in FIG. 16), for a self-sterilizing package wrap. FIG. 17 is yet another embodiment showing a sterilizing package 500 having an antimicrobial layer 20 for bio-secure protection.

Figure 18:
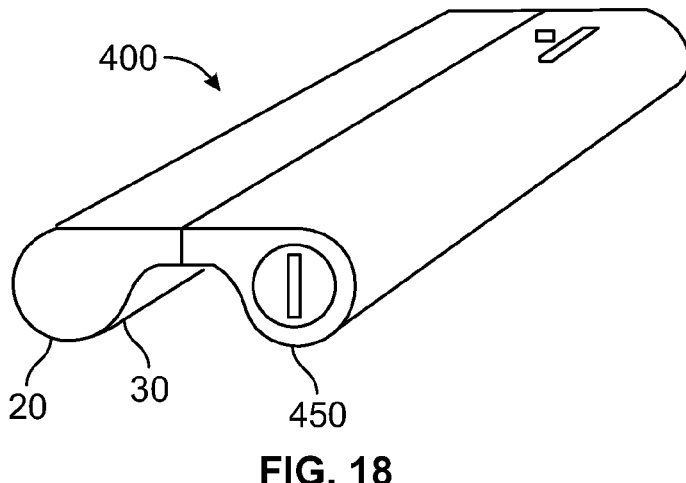
FIG. 18 is a perspective view showing a laminate sheet being pulled out of a sheet storage body (roll).
Figure 19:
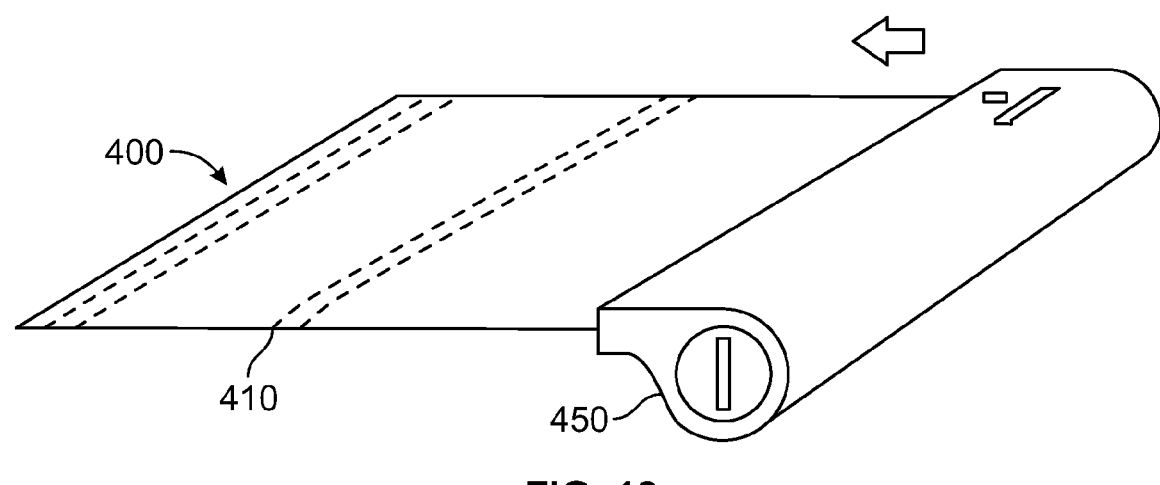
FIG. 19 is a perspective view showing perforated laminate sheets as being pulled out of the sheet storage body in FIG. 18.

The laminate structure can be cut fit to size from a sheet, or dispensed from a continuous sheet roll 400 of laminates with at least an antimicrobial layer 20 and a support layer 30 as shown in FIG. 18. The continuous roll can be dispensed automatically from a dispenser (not shown), or hand-operated with a knob 450. In an embodiment as illustrated in FIG. 19, the laminate structure is perforated, allowing the antimicrobial layer/support structured to be easily removed or pull-out from storage roll 400.

Figure 20:
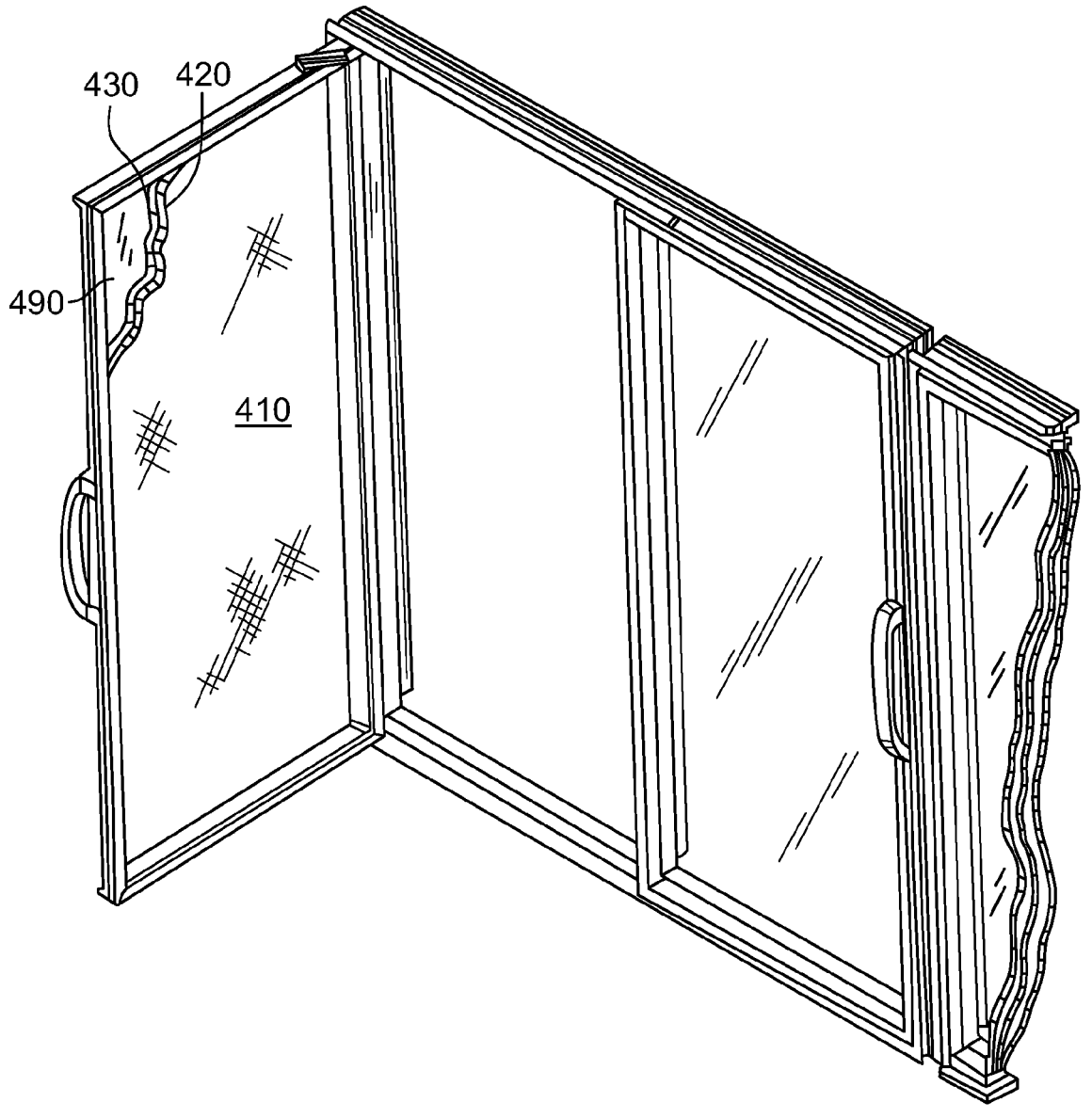
FIG. 20 illustrates an application of the laminate structure as an anti-fog self-sterilizing protective film for a freezer door.

In a (large) roll form for industrial or hospital application, the laminate structure can be used to protect large surfaces as examining tables, doors, liners in a hospital room, or as shown in FIG. 20, e.g., for a home or industrial size refrigerator, or a door 410 to a cold room with transparent panel door 490. The optional support layer 430 is disposed directly onto the surface of the door 490, with the antimicrobial layer 420 being exposed to colder temperatures when door 410 is closed and warmer temperatures when door 410 is open. In embodiments with transparent antimicrobial layer and support layer, the laminate structure is particularly suitable for use with clear or transparent refrigerator or freezer door allowing see-through.

Figure 21:
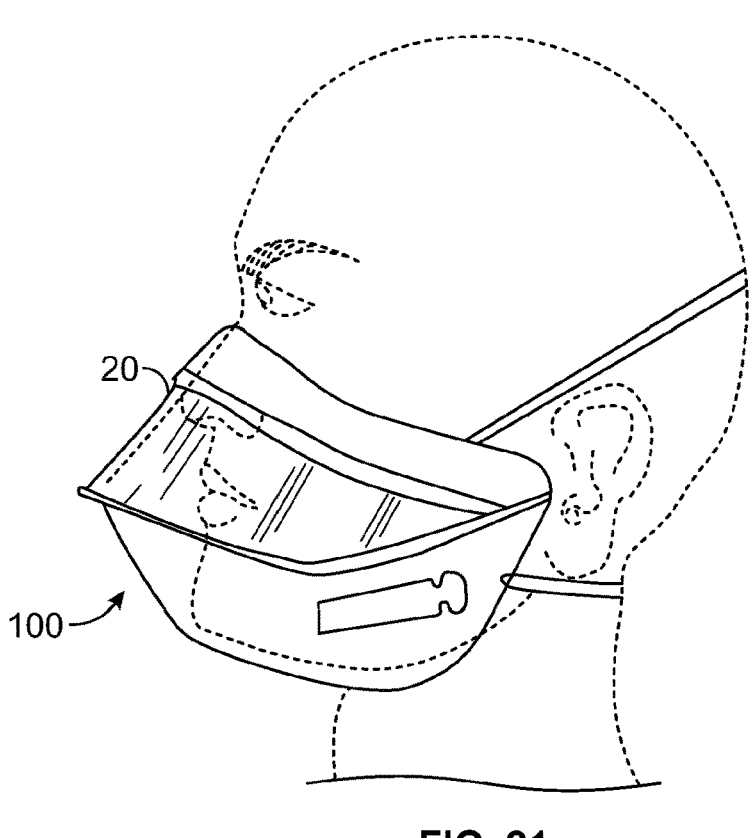
FIG. 21 illustrates another anti-fog self-sterilizing application of the laminate structure in a transparent facemask.
Figure 22:
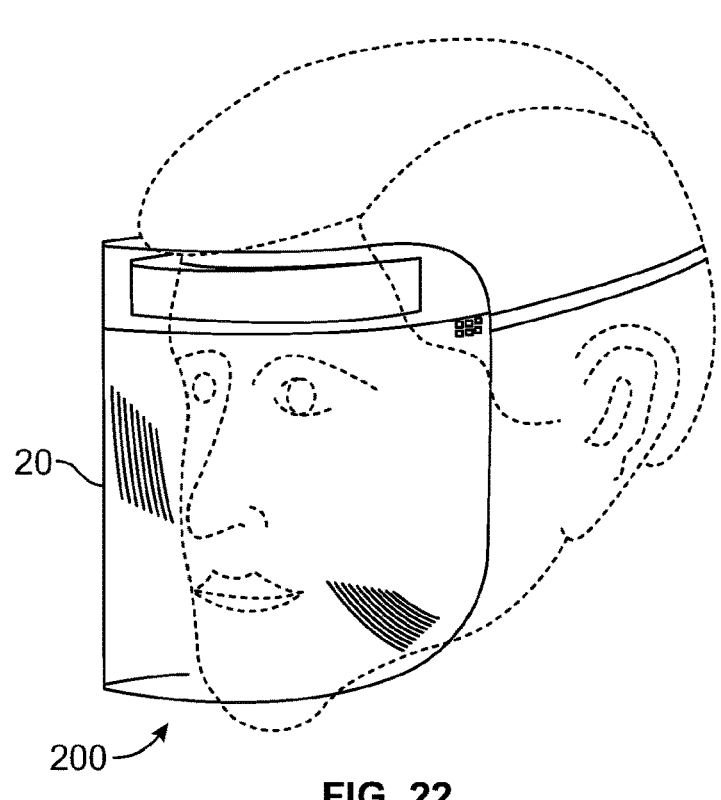
FIG. 22 illustrates yet another anti-fog self-sterilizing application of the laminate structure in a transparent face shield.

In a smaller form like sheets, the laminate structure with a transparent antimicrobial layer 20 can be cut to fit the inside of the transparent portion of facemask 100 as shown in FIG. 21, to instantly kill airborne infectious particles expelled from the respiratory tract of an infected person by coughing, sneezing, or by simple exhalation. The transparent antimicrobial layer 29 can also be used with a face shield 200 as shown in FIG. 22, for the protection of the wearer (if coated outside of the face shield) as well as the general public, airborne infectious particles expelled by the wearer of face shield 200.

Examples: The following examples are intended to be non-limiting.

Example 1: Tests were conducted to evaluate antimicrobial efficacy & the long-lasting antiviral properties of sulfonated polymers, film samples of sulfonated penta block copolymer (SPBC) of the structure poly[tert-butylstyrene-b-(ethylene-alt-propylene)-b-(styrene-co-styrene—sulfonate)-b-(ethylene-alt-propylene)-tert-butylstyrene] with 52% sulfonation were cast out of 1:1 mixture of toluene and 1-propanol. The sulfonated polymer film samples were subjected to abrasion testing of 2200 cycles in the presence of 3 common disinfectants: 1) 70% ethanol, benzalkonium chloride, and quaternary ammonia], and exposure to SARS-CoV-2 virus suspension of concentration $10^7$ pfu/ml.

After 2 hours of contact, viable virus was recovered from each sample by washing twice with 500 µl of DMEM tissue culture media containing 10% serum, and measured by serial dilution plaque assay. Gibco Dulbecco's Modified Eagle Medium (DMEM) is a basal medium for supporting the growth of many different mammalian cells. The results demonstrate that, after abrasion testing representing approximately one year of cleaning (6 disinfectant wipes/day), surface pro Gibco Dulbecco's Modified Eagle Medium (DMEM) is a widely used basal medium for supporting the growth of many different mammalian cells Example 2: In this example, a multi-layer laminate is structured by casting a sulfonated block polymer solution (sulfonated block polymers in toluene/1-propanol at a 1:1 ratio) onto a Mylar sheet of 1 mil (25.4 µm) thick.

The casting is done on a mechanical casting table with a casting blade, e.g., Elcometer 4340, that controls the thickness, and the speed of solution being casted on a substrate. A set amount of sulfonated polymer, depending on the desired thickness, is poured onto a substrate. A casting blade is pulled over the liquid, creating a uniform thickness over a substrate. The material is next placed in a chamber where the solvent can be slowly evaporated. After all the solvent is evaporated, the casting is complete forming a laminate structure having thickness ranging from 0.0176 inches (0.044 cm) to 0.0003 inches (0.00076 cm).

Surface pH of the antimicrobial layer is measured using a surface pH measuring probe (EDT DirectION Limited model E8087). For the pH test, a small drop of water around 0.02 ml of water is placed on the antimicrobial layer. The probe is placed on top of the water drop and is touched to the surface of the layer, and pH is measured after 5 minutes, giving a pH of 2.0.

Example 3: Various solutions of sulfonated block polymer were prepared by diluting dried sheets of sulfonated block copolymers from Kraton Corp. in solvent systems of cyclohexane, toluene, or a blend of 1:1 toluene and 1-propanol. Solutions prepared ranged from 1%-20% solids, preferably 5%-8% solids for spraying.

Dilute sulfonated block copolymer solutions are poured into the spray cup reservoir of high-volume, low pressure (HVLP) spray gun, and applied by powering the sprayer with approximately 26 psi of house air and squeezing the sprayer trigger. Coatings are applied onto different substrates, including Plexiglas, Tyvek, non-woven fabrics, surgical masks, N95 masks, medical specimen bags, mylar, stainless steel and other metals, exam gloves, solid surface countertop, decorative graphic laminate film, leather, carpet, HVAC filter media, plastic, cardboard, and glass.

Example 4. A polyethylene flat sheet of 0.5 mm thick is chlorosulfonated by immersing for six hours at room temperature in a sulfur dioxide/chlorine gas mixture (3:1 volume ratio) in visible light. The chlorosulfonated polyethylene sheet is then immersed in 1N NaOH at 50° C. for two days to hydrolyze the pendant sulfonyl chloride groups ($—SO_2Cl$) groups to sulfonic groups ($—SO_3Na+$). The sulfonic acid form is obtained by treating the sheet with 1N HCl at room temperature for four hours. The sheet is then washed with deionized water and dried under vacuum. The milli-equivalence (meq) of sulfonic acid groups per gram of polyethylene is determined by titration with NaOH and found to be 1.69 meq/g. The sulfonated polyethylene sheet can be cut into appropriate sizes for the protection of surfaces.

Example 5. Dichloromethane (50 mL, 66 gm) and chlorosulfonic acid (between 0.7 and 1.4 gms) are added sequentially to a wide mouth glass bottle (120 mL capacity, 2 inch diameter). 10 mL of this solution are added to dichloromethane (50 mL, 66 gms) in a wide mouth glass jar (410 mL, 3 inch diameter). To this mixture is added a 1 mil (0.001 inch, 0.0025 cm) colorless PPS (Polyphenylene Sulfide) film. The film is allowed to react for various amounts of time at 25° C. while being suspended in the reaction solution. After a variable time of reaction, the black film is then added to distilled water (200 mL) and the film turned light yellow. The film is washed extensively with more water (about 2 liter) and then boiled in water (250 mL) for about 1 hour. The film is then suspended in 1 molar sodium chloride (220 mL) and the amount of sulfonation is determined by titration with 0.01 molar sodium hydroxide to a pH 7 end point. The amount of sulfonation (in meq/g $SO_3H$) with reaction-time is 0.64 (1 hour), 1.27 (6.5 hours), 1.71 (16 hours), 1.86 (24 hours), 2.31 (48 hours), and 2.6 (60 hours). The sulfonated poly(phenylene sulfide) film can be used for antimicrobial applications as coating materials or as protective films.

Example 6. The example was conducted to evaluate the effectiveness in inhibiting *Aspergillus niger* black mold according to the AATCC Test Method 30-2004 Test III. Six different sulfonated block copolymer membrane samples comprising a poly[tert-butylstyrene-b-(ethylene-alt-propylene)-b-(styrenesulfonate)-b-(ethylene-alt-propylene)-b-tert-butylstyrene], at different levels of sulfonation from 26 to 52% were used for the tests. *Aspergillus niger*, ATCC #6275, was harvested into sterile distilled water containing glass beads. The flask was shaken to bring the spores into suspension. The suspension was used as the test inoculum. One (1.0) mL of the inoculum was even distributed over the surface of Mineral Salts Agar plates. The membrane samples were placed onto the inoculated agar surface. After placement, 0.2 mL of the inoculum was distributed over surface of each disc. A viability plate of the spore suspension was prepared on Mineral Salts Agar with 3% glucose. A positive growth control was prepared using an untreated cotton duck fabric on Mineral Salts Agar and set up in the same manner as the test items. All samples were incubated at 28° C.±1° C. for 14 days.

The viability plate had acceptable fungal growth as expected confirming the viability of the inoculum. The sample with 26% sulfonation showed microscopic growth on 10% of the sample surface. The other 5 test samples showed no growth, or microscopic growth on 1% of the surface. The control sample showed macroscopic growth on 100% of the surface.

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

Unless otherwise specified, all technical and scientific terms used herein have the same meanings as commonly understood by one of skill in the art to which the disclosed disclosure belongs. the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A laminate structure for protecting surfaces prone to microbial contamination, the laminate structure comprising:

at least one antimicrobial layer; and at least a second layer, wherein the antimicrobial layer consists of a sulfonated polymer, wherein the sulfonated polymer is a selectively sulfonated negatively-charged block copolymer having a general configuration of: A-B-A, $(A-B)_n(A)$, $(A-B-A)_n$, $(A-B-A)_nX$, $(A-B)_nX$, A-D-B, A-B-D, A-D-B-D-A, A-B-D-B-A, $(A-D-B)_nA$, $(A-B-D)_nA$ $(A-D-B)_nX$, $(B-D-B)_nX$, $(A-B-D)_nX$ or mixtures thereof, wherein n is an integer from 0 to 30, X is a coupling agent residue, each A and D block is a polymer block resistant to sulfonation, each B block is susceptible to sulfonation, the A block is selected from polymerized (i) para-substituted styrene monomers, (ii) ethylene, (iii) alpha olefins of 3 to 18 carbon atoms; (iv) 1,3- cyclodiene monomers, (v) monomers of conjugated dienes having a vinyl content less than 35 mol percent prior to hydrogenation, (vi) acrylic esters, (vii) methacrylic esters, and (viii) mixtures thereof;

the B block is a vinyl aromatic monomer, the D block is a hydrogenated polymer or copolymer of a conjugated diene selected from isoprene, 1,3-butadiene and mixtures thereof;

wherein the block B is selectively sulfonated to contain from 10-100 mol % of the monomer units in block B bear sulfonic acid ($-SO_3H$) groups in their free acid form, and are not neutralized or converted to salts, esters, or other derivatives;

wherein the antimicrobial layer has a surface pH of <3.0; and wherein the antimicrobial layer has a thickness of at least >1 μm to kill at least 90% of microbes within 120 minutes of contact with the laminate structure;

wherein the laminate structure is removably adhered to the surfaces electrostatically, adhesively, or by mechanical means.

2. The laminate structure of claim 1, wherein the sulfonated polymer has an ionic exchange capacity (IEC) of >0.5 meq/g.

3. The laminate structure of claim 1, wherein the antimicrobial layer has a thickness of at least >5 μm, and wherein the antimicrobial layer kills >95% of microbes within 120 minutes of contact after six months of application onto the surfaces.

4. The laminate structure of claim 1, wherein the coating material kills at least 95% of microbes within 30 minutes of contact.

5. The laminate structure of claim 1, wherein the second layer is a support layer or a liner.

6. The laminate structure of claim 1, further comprising at least one structural element selected from one or more of a support layer and a liner.

7. The laminate structure of claim 1, wherein the selectively sulfonated negatively-charged block copolymer is dissolved in one or more solvents.

8. An article comprising the laminate structure of claim 1.

9. A method of making a laminate structure for protecting surfaces prone to microbial contamination, the method comprises:

applying an antimicrobial composition to a self-adhering peel and stick substrate having a removable liner and an adhesive layer disposed substantially on entire surface of the removable liner, for the antimicrobial composition to substantially coat the entire surface of the adhesive layer forming an antimicrobial layer, wherein the antimicrobial composition consists of a sulfonated polymer, wherein the sulfonated polymer is a selectively sulfonated negatively-charged block copolymer having a general configuration of: A-B-A, $(A-B)_n(A)$, $(A-B-A)_n$, $(A-B-A)_nX$, $(A-B)_nX$, A-D-B, A-B-D, A-D-B-D-A, A-B-D-B-A, $(A-D-B)_nA$, $(A-B-D)_nA$ $(A-D-B)_nX$, $(B-D-B)_nX$, $(A-B-D)_nX$ or mixtures thereof, wherein n is an integer from 0 to 30, X is a coupling agent residue, each A and D block is a polymer block resistant to sulfonation, each B block is susceptible to sulfonation, the A block is selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof;

the B block is a vinyl aromatic monomer, the D block is a hydrogenated polymer or copolymer of a conjugated diene selected from isoprene, 1,3-butadiene and mixtures thereof;

wherein the block B is selectively sulfonated to contain from 10-100 mol % of the monomer units in block B bear sulfonic acid ($—SO_3H$) groups in their free acid form, and are not neutralized or converted to salts, esters, or other derivatives;

wherein the laminate structure when applied onto surfaces, adheres to the surfaces electrostatically or adhesively; and wherein the antimicrobial layer has thickness of at least 1 μm to kill at least 90% of microbes within 120 minutes of contact with the surfaces protected by the laminate structure; and wherein the antimicrobial layer has a surface pH of <3.0.

10. A method of making a laminate structure for protecting surfaces prone to microbial contamination, the method comprises:

applying an antimicrobial composition to a first structural element to form a coating on the first structural element;

removing at least a portion of one or more solvents from the antimicrobial composition to form an antimicrobial layer;

applying an adhesive layer to the outer surface of the antimicrobial layer;

removing at least a portion of one or more solvents from the adhesive layer to form an support layer; and optionally, adding a second structural element to cover the support layer, wherein the antimicrobial composition consists of a sulfonated polymer, wherein the sulfonated polymer is a selectively sulfonated negatively-charged block copolymer having a general configuration of: A-B-A, (A-B)$_n$(A), (A-B-A)$_n$, (A-B-A)$_n$X, (A-B)$_n$X, A-D-B, A-B-D, A-D-B-D-A, A-B-D-B-A, (A-D-B)$_n$A, (A-B-D)$_n$A (A-D-B)$_n$X, (B-D-B)$_n$X, (A-B-D)$_n$X or mixtures thereof, wherein n is an integer from 0 to 30, X is a coupling agent residue, each A and D block is a polymer block resistant to sulfonation, each B block is susceptible to sulfonation, the A block is selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof;

the B block is a vinyl aromatic monomer, the D block is a hydrogenated polymer or copolymer of a conjugated diene selected from isoprene, 1,3-butadiene and mixtures thereof;

wherein the block B is selectively sulfonated to contain from 10-100 mol % of the monomer units in block B bear sulfonic acid ($—SO_3H$) groups in their free acid form, and are not neutralized or converted to salts, esters, or other derivatives;

wherein the antimicrobial layer has thickness of at least 1 μm to kill at least 90% of microbes within 120 minutes of contact with the surfaces protected by the laminate structure; and wherein the antimicrobial layer has a surface pH of <3.0.

11. The method of claim 9, wherein the sulfonated polymer has an ionic exchange capacity (IEC) of >0.5 meq/g.

12. The method of claim 9, wherein the coating material kills at least 95% of microbes within 30 minutes of contact.

13. The method of claim 9, wherein the antimicrobial layer has a thickness of at least >5 μm, and wherein the antimicrobial layer kills >95% of microbes within 120 minutes of contact after six months of application onto the surfaces.

* * * * *